(12) United States Patent
Milner et al.

(10) Patent No.: US 12,549,460 B1
(45) Date of Patent: *Feb. 10, 2026

(54) TIMELINE FRAMEWORK FOR TIME-STATE ANALYTICS

(71) Applicant: Conviva Inc., Foster City, CA (US)

(72) Inventors: Henry Milner, Burlingame, CA (US); Oleg Puzyrko, San Mateo, CA (US); Jibin Zhan, San Mateo, CA (US); Hui Zhang, Burlingame, CA (US); Akara Sucharitakul, Foster City, CA (US); Vyas Sekar, Foster City, CA (US); Yihua Cheng, Chicago, IL (US)

(73) Assignee: Conviva Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,757

(22) Filed: Feb. 2, 2024

Related U.S. Application Data

(63) Continuation of application No. 18/241,121, filed on Aug. 31, 2023, now Pat. No. 11,943,123.

(60) Provisional application No. 63/403,262, filed on Sep. 1, 2022.

(51) Int. Cl.
*H04L 43/067* (2022.01)
*H04L 43/045* (2022.01)

(52) U.S. Cl.
CPC .......... *H04L 43/067* (2013.01); *H04L 43/045* (2013.01)

(58) Field of Classification Search
None
See application file for complete search history.

(56) References Cited

U.S. PATENT DOCUMENTS

| | | | | |
|---|---|---|---|---|
| 6,473,407 B1 * | 10/2002 | Ditmer | ............... | G06Q 99/00 707/E17.107 |
| 6,473,794 B1 * | 10/2002 | Guheen | ............... | H04L 43/50 709/224 |
| 11,250,069 B1 | 2/2022 | Bianchi | | |
| 11,388,211 B1 * | 7/2022 | Breeden | ............ | G06F 16/24568 |
| 11,516,269 B1 | 11/2022 | Chang, Jr. | | |

(Continued)

OTHER PUBLICATIONS

Adams et al. 2020. Monarch: Google's planet-scale in-memory time series database. Proceedings of the VLDB Endowment 13, 12 (2020), 3181-3194.

(Continued)

*Primary Examiner* — Ranodhi Serrao
(74) *Attorney, Agent, or Firm* — Van Pelt, Yi & James LLP

(57) ABSTRACT

Determining a time-state metric includes receiving a stream of raw data values of an attribute. Each received raw data value of the attribute is associated with a timestamp. It further includes converting the received stream of raw data values into a timeline representation of the attribute over time. The timeline representation comprises a sequence of spans. A span comprises a span start time, a span end time, and a span value. The span value comprises an encoding of one or more values of the attribute over a time interval determined by the span start time and the span end time. It further includes determining a time-state metric according to a timeline request configuration. The timeline request configuration comprises one or more timeline operations. The time-state metric is computed at least in part by performing a timeline operation on the timeline representation of the attribute.

21 Claims, 20 Drawing Sheets

(56) References Cited

U.S. PATENT DOCUMENTS

| | | | |
|---|---|---|---|
| 11,526,425 B1 | 12/2022 | Karis | |
| 2002/0052941 A1* | 5/2002 | Patterson | H04L 41/22 709/222 |
| 2002/0095487 A1* | 7/2002 | Day | H04L 61/00 709/223 |
| 2002/0103889 A1* | 8/2002 | Markson | H04L 67/1097 709/223 |
| 2002/0149601 A1* | 10/2002 | Rajarajan | G06F 9/5055 345/619 |
| 2002/0149615 A1* | 10/2002 | Rajarajan | H04L 41/0806 715/738 |
| 2002/0161876 A1* | 10/2002 | Raymond | G06F 9/44 709/223 |
| 2002/0161885 A1* | 10/2002 | Childers | H04L 67/02 709/224 |
| 2016/0216873 A1 | 7/2016 | Filippi | |
| 2017/0132523 A1 | 5/2017 | Zhang | |

OTHER PUBLICATIONS

Akidau et al. 2015. The Dataflow Model: A Practical Approach to Balancing Correctness, Latency, and Cost in Massive-Scale, Unbounded, Out of-Order Data Processing. Proceedings of the VLDB Endowment 8 (2015), 1792-1803.

Armbrust et al. 2015. Spark SQL: Relational Data Processing in Spark. In Proc. ACM SIGMOD.

Carbone et al. 2015. Apache flink: Stream and batch processing in a single engine. Bulletin of the IEEE Computer Society Technical Committee on Data Engineering 36, 4 (2015).

Etzion et al. 2006. Event-Driven Architectures and Complex Event Processing. In 2006 IEEE International Conference on Services Computing (SCC'06). xxx-xxx. https://doi.org/10.1109/SCC.2006.49.

Gencer et al. 2021. Hazelcast Jet: Low-latency Stream Processing at the 99.99th Percentile. https://doi.org/10.48550/ARXIV.2103.10169.

Hirzel et al. 2014. A Catalog of Stream Processing Optimizations. ACM Comput. Surv. 46, 4, Article 46 (Mar. 2014), 34 pages. https://doi.org/10.1145/2528412.

Jain et al. 2008. Towards a Streaming SQL Standard. Proc. VLDB Endow. 1, 2 (Aug. 2008), 1379-1390. https://doi.org/10.14778/1454159.1454179.

Pelkonen et al. 2015. Gorilla: A Fast, Scalable, in-Memory Time Series Database. Proc. VLDB Endow. 8, 12 (Aug. 2015), 1816-1827. https://doi.org/10.14778/2824032.2824078.

Zaharia et al. 2013. Discretized Streams: Fault-Tolerant Streaming Computation at Scale. In Proc. SOSP.

Zaharia et al. 2012. Spark: Cluster Computing with Working Sets. In Proc. NSDI.

* cited by examiner

| Timestamp | Player | Bitrate | CDN | Seek |
|---|---|---|---|---|
| $t_1$ | Buffer | | | |
| $t_2$ | | | C1 | |
| $t_3$ | | B1 | | |
| $t_4$ | Play | | | |
| $t_5$ | Buffer | | | |
| $t_6$ | Play | | | |
| $t_7$ | Buffer | | | Seek |
| $t_8$ | | B2 | | |
| $t_9$ | Paused | | | |
| $t_{10}$ | Play | | | |
| $t_{11}$ | | B3 | | |
| $t_{12}$ | Buffer | | | |
| $t_{13}$ | | | C2 | |
| $t_{14}$ | Play | | | |
| $t_{15}$ | | B1 | | |

FIG. 1B

| Timestamp | Player | Bitrate | CDN | Seek |
|---|---|---|---|---|
| $t_1$ | Buffer | | | |
| $t_2$ | | | C1 | |
| $t_3$ | | B1 | | |
| $t_4$ | Play | | | |
| $t_5$ | Buffer | | | |
| $t_6$ | Play | | | |
| $t_7$ | | | | Seek |
| $t_8$ | Buffer | B2 | | |
| $t_9$ | Paused | | | |
| $t_{10}$ | Play | | | |
| $t_{11}$ | | B3 | | |
| $t_{12}$ | Buffer | | | |
| $t_{13}$ | | | C2 | |
| $t_{14}$ | Play | | | |
| $t_{15}$ | | B1 | | |

FIG. 1C

| Timestamp | Player | Bitrate | CDN | Seek |
|---|---|---|---|---|
| $t_1$ | Buffer | | | |
| $t_2$ | | | C1 | |
| $t_3$ | | B1 | | |
| $t_4$ | Play | | | |
| $t_5$ | Buffer | | | |
| $t_6$ | Play | | | |
| $t_7$ | | | | Seek |
| $t_8$ | Buffer | B2 | | |
| $t_9$ | Paused | | | |
| $t_{10}$ | Play | | | |
| $t_{11}$ | | B3 | | |
| $t_{12}$ | Buffer | | | |
| $t_{13}$ | | | C2 | |
| $t_{14}$ | Play | | | |
| $t_{15}$ | | B1 | | |

FIG. 1D

```
1   WITH SeekAsPlayerState(T, P) as (
2     SELECT T, P FROM heartbeats WHERE P IS NOT NULL
3     UNION SELECT T, "Seek_st" FROM heartbeats WHERE A IS NOT NULL
4     UNION SELECT T + 5, "Seek_ed" FROM heartbeats WHERE A IS NOT NULL ),
5   IgnoreBufBeforePlay(T, P) as (
6     SELECT T, P FROM (
7       SELECT T, P, Max(If(P == 'play', 1, 0)) OVER (PARTITION BY 1 ORDER BY T)
            ↪ as H
8     FROM SeekAsPlayerState) WHERE H == True ),
9   DuringBufferTable(T, P, DB) as (
10    SELECT T, P, LAST(tmp1) lGNORE NULLS OVER (PARTITION BY 1 ORDER BY T)
11    FROM (
12      SELECT T, P,
13            CASE P WHEN 'buffer' THEN True WHEN 'Seek_st' THEN NULL WHEN 'SEEK_ed'
               ↪ THEN NULL ELSE FALSE END as tmp1
14      From IgnoreBufBeforePlay ) ),
15  DuringSeekTable(T, P, DB, DS) as (
16    SELECT T, P, DB,
17          (T - Max(IF(P == 'Seek_st', T, 0)) OVER (PARTITION BY 1 ORDER BY T)
              ↪ ) < 5 as tmp2
18    FROM DuringBufferTable ),
19  IgnoreBufInSeek(T, P) as (
20    SELECT T, P FROM (
21      SELECT T, DS, IF (P == 'Seek_ed' and DB, 'buffer', P) as P
22      FROM DuringSeekTable ) WHERE NOT (P == 'buffer' AND DS) ),
23  WithCDNAndQuerry(T, P, C) as (
24   SELECT T, P, NULL FROM IgnoreBufInSeek
25   UNION SELECT T, NULL, C FROM heartbeats where C IS NOT NULL
26   UNION SELECT 2022-07-21 10:05, NULL, NULL s),
27  Intervals(Ed, St, State, CDN) as (
28    SELECT T, LEAD(T, 1) OVER (PARTITION BY 1 ORDER BY T), P, C
29    FROM (
30      SELECT T,
31            LAST(P) IGNORE NULLS OVER (PARTITION BY 1 ORDER BY T) as P,
32            LAST(C) IGNORE NULLS OVER (PARTITION BY 1 ORDER BY T) as C,
33      FROM WithCDNAndQuerry ) )
34  SELECT SUM(St _ Ed) as result FROM lntervals
35  WHERE Ed < 2022-07-21 10:05 AND State == 'buffer' AND CDN == 'CDN1'
```

FIG. 1E

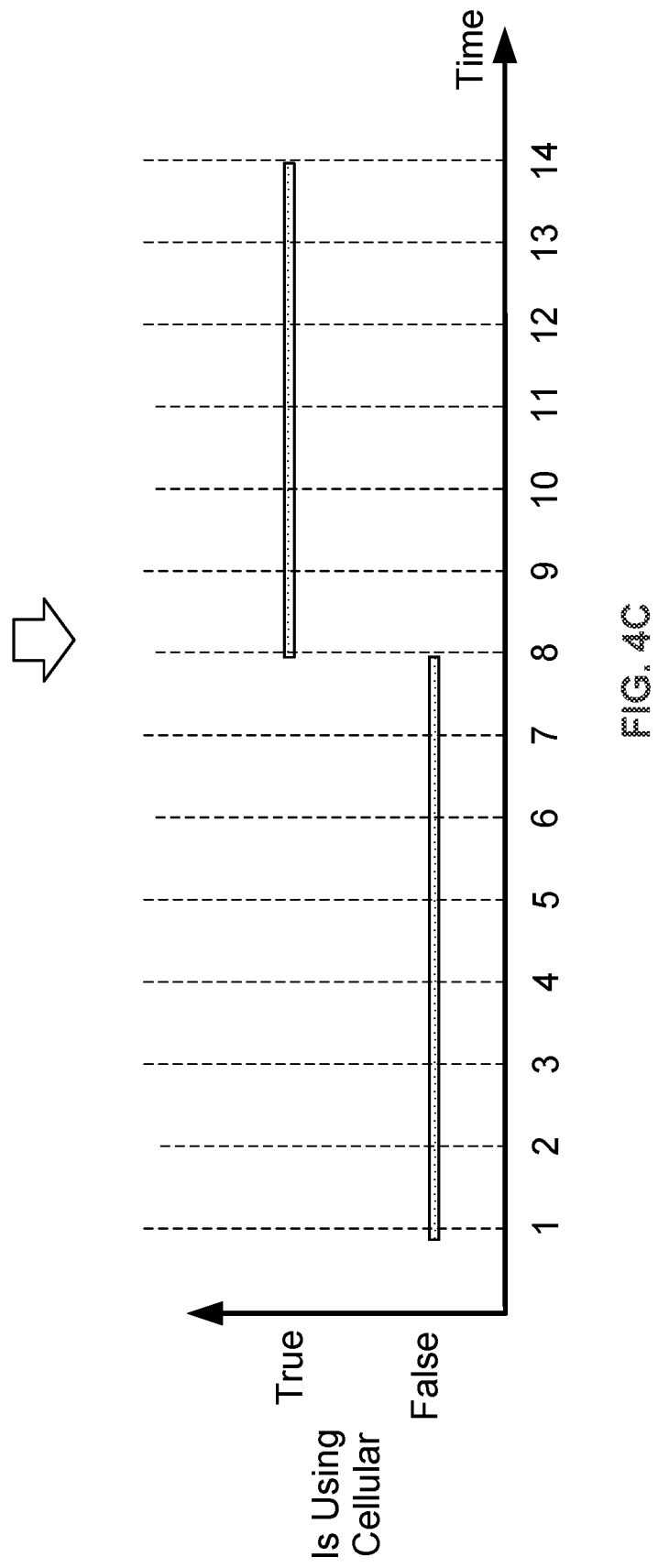

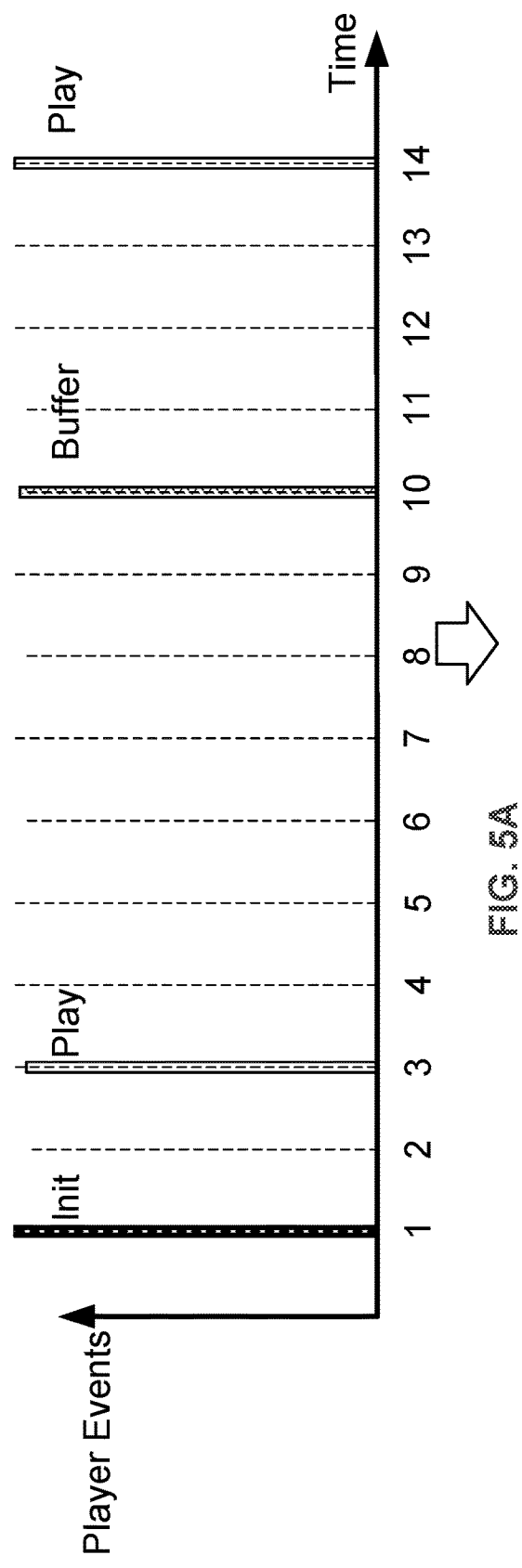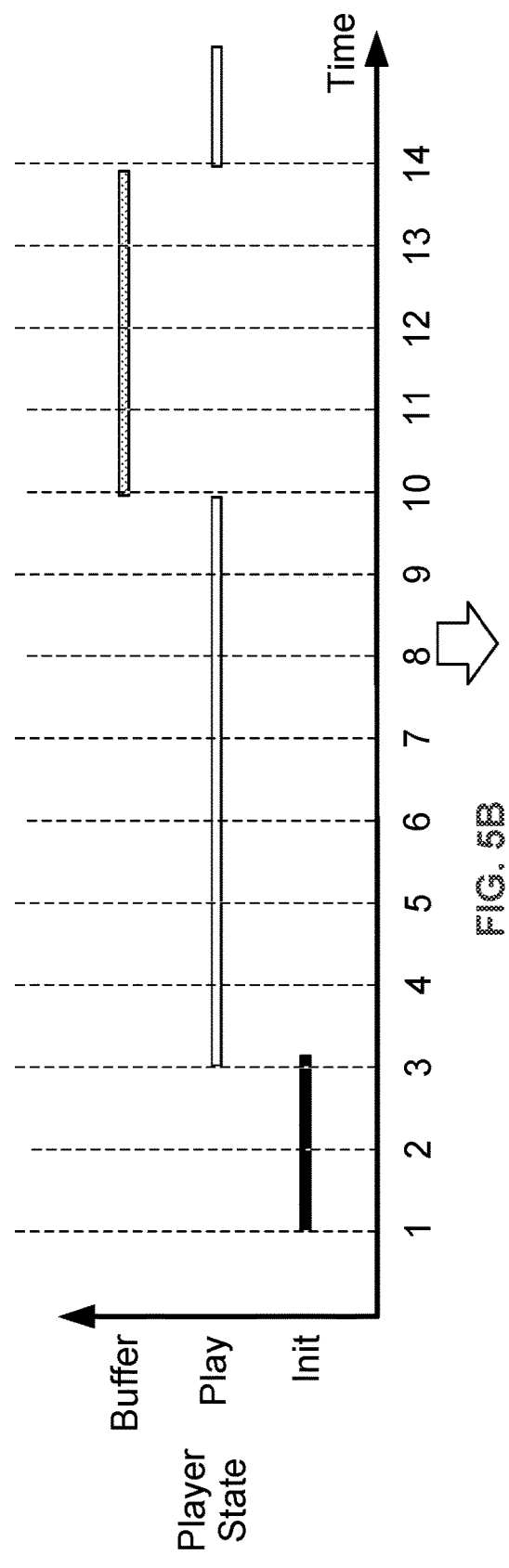

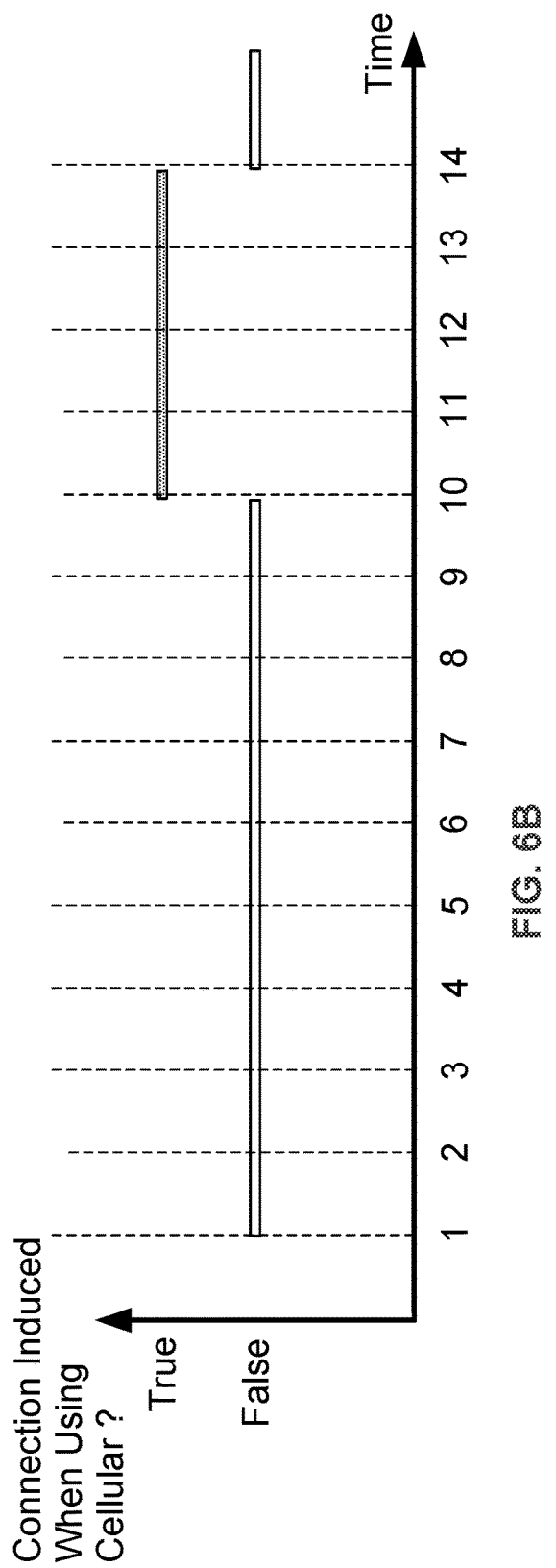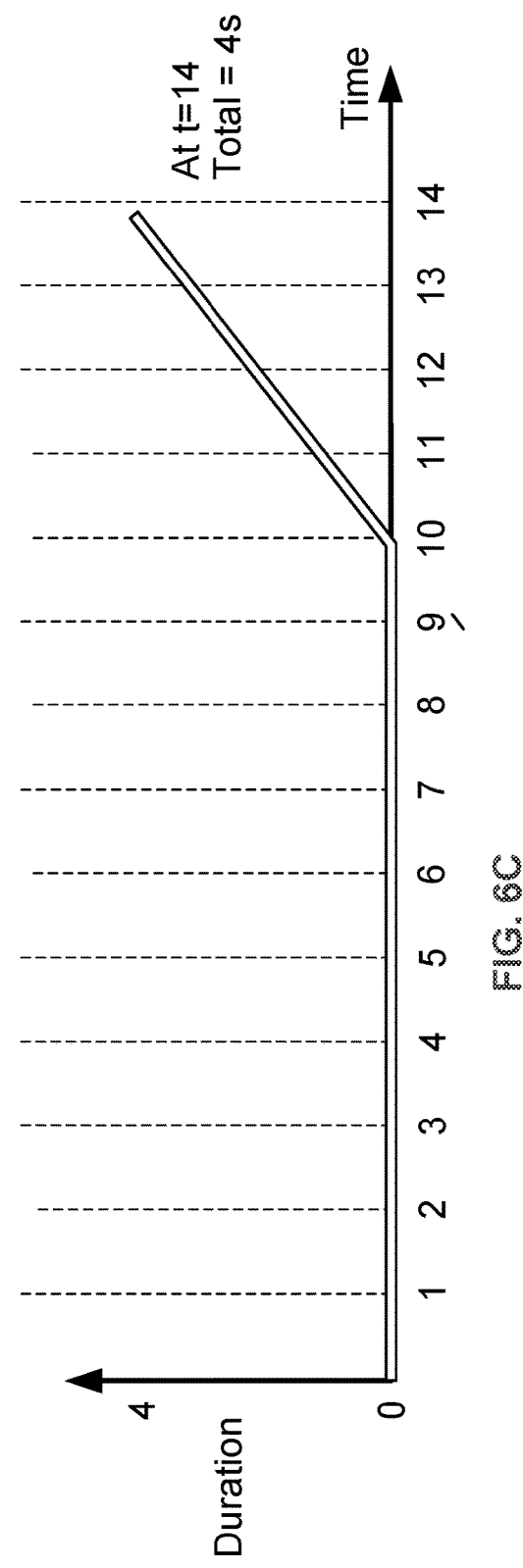

```
inputs:
  appAnalyticsEnrichedHeartbeats:
    format:
      name: json # optional
    location:
      bootstrapServers: localhost:9092
      topic: app-analytics
    sessionIdpath: "contexts_com_snowplowanalytics_snowplow_client_session_1_0_2.0.session_id"  ── 902
    timePath: "dvce_created_tstamp" ── 904
dag:
  rawEvents:
    op: eventSourceTimeline
    source: $appAnalyticsEnrichedHeartbeats
  events:
    op: get
    in: $rawEvents
    path: "unstruct_event_com_conviva_conviva_video_events_1_0_2.name"
  attemptTrue:
    op: hasBeenTrue
    in:
      op: equals # output an event timeline with 'true' or 'false'
      left: $events
      right: "screen_view" # TODO: check if multiple events need to be matched, possibly change 'equals' to 'filterByValue'
  timeToFirstAttempt:
    op: durationTrue
    in:
      op: not
      in: $attemptTrue
  evaluatedInRealtime:
    op: evaluateAt
    in: $timeToAttempt
    evaluationPoints: $rawEvents
taps:
  out:
    timeline: $evaluatedInRealtime
    destination:
      protocol: kafka
      bootstrapServers: localhost:9092
      topic: app-analytics-result
```

908 → rawEvents
910 → events
912 → attemptTrue
906 → (equals block)
914 → timeToFirstAttempt
916 → evaluatedInRealtime
918 → taps
920 → destination

FIG. 9

Timeline generalizations of classical Operators

| Operator | Description | Diagram |
|---|---|---|
| ==, <, > [constant] | Compare each update or state with a fixed value, producing True or False | 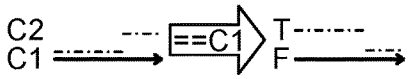 |
| &, \| [timeline] | Combine 2 timelines by applying a logical operation at each point in time | 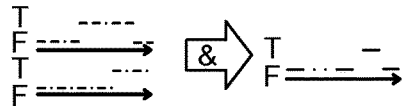 |
| ~ | Logically invert each update or state |  |

Timeline-specific Operators

| Operator | Description | Diagram |
|---|---|---|
| TL_HASEXISTED | A StateDynamics timeline of the *cumulative OR* | 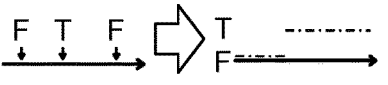 |
| TL_HASEXISTEDWITHIN | As TL_HASEXISTED, but resets to False after a specified duration D without True values | D = 4 seconds 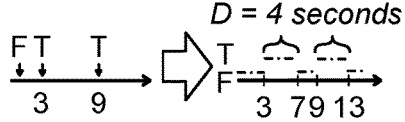 |
| TL_LATESTEVENTTOSTATE | A StateDynamics Timeline of the latest update | 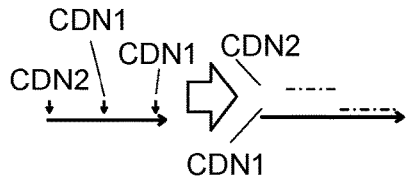 |
| TL_DURATIONWHERE | A Numerical Timeline of the cumulative duration where the state was True | 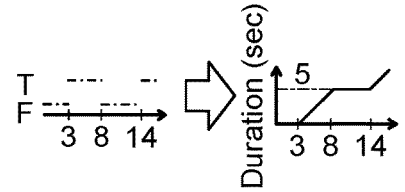 |
| TL_DURATIONINCURSTATE | A Numerical Timeline of the duration since the last state change | 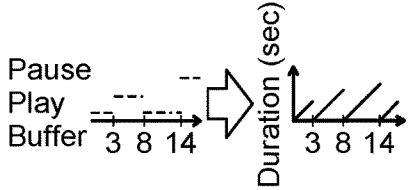 |

FIG. 10

```
object UnaryStatefulEventToState { def apply[InputValue, OutputValue] (
    initialState: OutputValue,
    f: (OutputValue, InputValue) => OutputValue,
    description: Option[OpDescription]
  ): UnaryStatefulOperator[InputValue, EventDynamics, EventsAtSpanEnd[InputValue], OutputValue, StateDynamics, OutputValue] =
    UnaryStatefulRawSpanFlatMap(
      initialState = initialState,
      f = { (stateAtSpanStart: OutputValue, inSpan: Span[EventsAtSpanEnd[InputValue]]) =>
        var currentState = stateAtSpanStart
        for (inEvent <= inSpan.payload.events) {
          currentState = f(currentState, inEvent)
        }
        val outputs = if (currentState == stateAtSpanStart || inSpan.isSinglePoint) {
          Seq(inSpan.copy(payload = currentState))
        } else {
          // The state changed at the end of this span, since (under the EventsAtSpanEnd encoding)
          // the span's events happen at its end.
          Seq(
            Span(inSpan.start, inSpan.end.justBefore, stateAtSpanStart),
            Span.point(inSpan.end, currentState))
        }
        (currentState, outputs)
      },
      description = description)

def apply[InputValue, OutputValue] (
    initialState: OutputValue,
    f: (OutputValue, InputValue) => OutputValue
  ): UnaryStatefulOperator[InputValue, EventDynamics, EventsAtSpanEnd[InputValue], OutputValue, StateDynamics, OutputValue] =
    UnaryStatefulEventToState(initialState, f, None)

def named[InputValue, OutputValue](
    name: String, parameterNames: String*)(
    initialState: OutputValue,
    f: (OutputValue, InputValue) => OutputValue
  ): UnaryStatefulOperator[InputValue, EventDynamics, EventsAtSpanEnd[InputValue], OutputValue,
    StateDynamics, OutputValue] =
```

FIG. 11

TIMELINE FRAMEWORK FOR TIME-STATE ANALYTICS

CROSS REFERENCE TO OTHER APPLICATIONS

This application is a continuation of U.S. patent application Ser. No. 18/241,121, entitled TIMELINE FRAMEWORK FOR TIME-STATE ANALYTICS filed Aug. 31, 2023 which is incorporated herein by reference for all purposes, which claims priority to U.S. Provisional Application No. 63/403,262, entitled TIMELINE FRAMEWORK FOR TIME-STATE ANALYTICS filed Sep. 1, 2022 which is incorporated herein by reference for all purposes.

BACKGROUND OF THE INVENTION

For serving workloads that involve context-sensitive stateful computations over continuously-evolving system and user/machine state, existing data processing systems entail high development time and complexity, as well as poor cost-performance tradeoffs. It would be beneficial to reduce development complexity and improve cost-performance tradeoffs when serving such a class of workloads.

BRIEF DESCRIPTION OF THE DRAWINGS

Various embodiments of the invention are disclosed in the following detailed description and the accompanying drawings.

FIG. 1B illustrates an embodiment of a tabular representation of events.

FIG. 1C illustrates an embodiment of data to be determined.

FIG. 1D illustrates an embodiment of determining a time-state condition.

FIG. 1E illustrates an example of an SQL query.

FIG. 4C illustrates an embodiment of a timeline.

FIG. 5A illustrates an embodiment of events at discrete points in time.

FIG. 5B illustrates an embodiment of a player state timeline.

FIG. 6B illustrates an embodiment of a context timeline.

FIG. 6C illustrates an embodiment of a duration timeline.

FIG. 9 illustrates an embodiment of a timeline configuration file.

FIG. 10 illustrates an embodiment of time-state operators.

FIG. 11 illustrates an embodiment of a timeline operator.

DETAILED DESCRIPTION

Figure 1A:
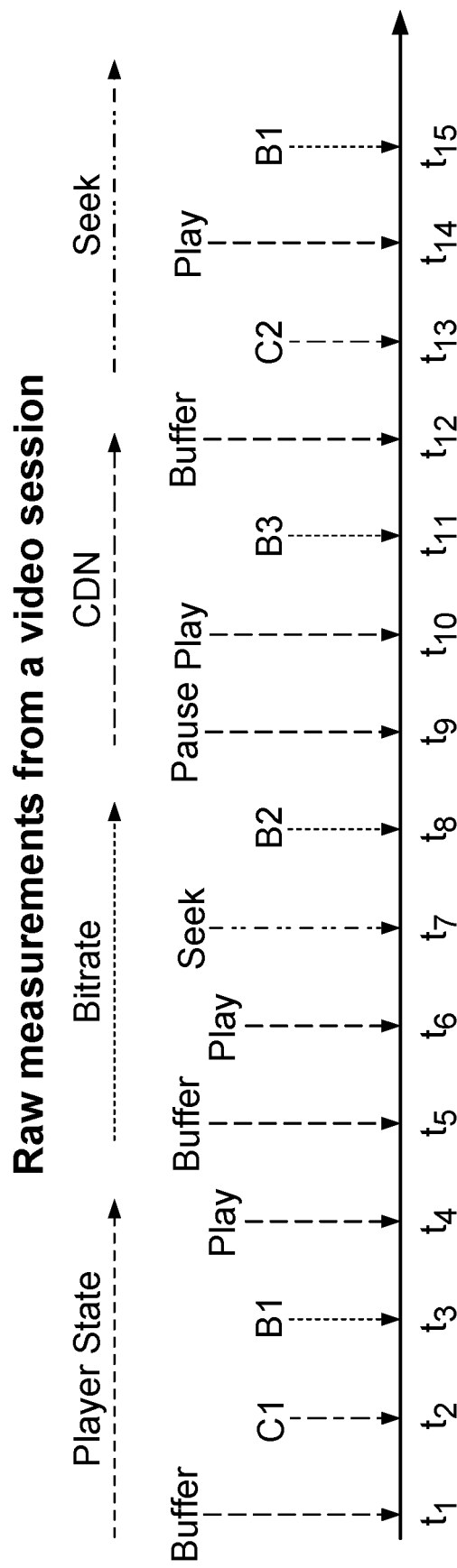
FIG. 1A illustrates an embodiment of raw measurements from a video session.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein are embodiments of a timeline framework for time-state analytics that arise across several real-world domains including operational management of large-scale systems and digital infrastructures. Embodiments of the techniques described herein may be used to solve a class of problems referred to herein as time-state analytics. Time state analytics appear in various applications and contexts, such as fitness tracking, healthcare data, mobile app data, video streaming data, infrastructure monitoring, and many other operational analytics and monitoring use cases.

For example, time state analytics are applicable to data that comes in from real world tracking measurements of particular entities, such as a user, device, video playback session, etc. In an example use case such as fitness tracking, various types of status events are collected from data measured with respect to a user, such as when the subject woke up, when they went for a run, various sensor measurements such as heart rate, etc. over time.

For entities being measured, whether devices, users, sessions, etc., suppose that various attributes and values are being measured over time. It would be beneficial to be able to perform analytics on such data collected over time. Examples of such types of analytics include summaries, such as the amount of time spent resting, average stress level, etc.

It would be further beneficial to be able to perform deeper analytics to understand the behavior of an entity, such as the user in a particular status or particular context. This includes determining insights based on both time and state context. In a health and/or fitness example, this includes determining how long a user was in deep sleep, how long the user was in a high stress state, how long the user was in an aerobic range (for heartbeat) when running, was the average VO2 increasing when running, etc. This includes determining measures that are conditioned on the entity also being in a particular context or set of states.

Described herein are techniques for performing time-state analytics, which includes determining time-state metrics. In various embodiments, the time-state metrics are measured in the context of time and state that an entity was in, beyond coarse aggregates (e.g., counts or averages). The time-state metrics include measures of interest of a particular data stream calculated in a particular stateful context. This includes tracking the state or the behavior of a system over time, including measuring statistics and durations of that particular entity over time. For example, determining time-state metrics includes determining, from streaming event data, statistics or measures for entities that are calculated while an entity is in a particular context or state. Other complex examples of time-state metrics and analytics include determining an amount of time or duration that an entity spent in a particular status, the amount of time spent in a certain status while another event was occurring (e.g., how long (duration) a subject was in an aerobic heart range (state) while running (another state)), etc. In such a complex stateful metric example, various states of a user are being tracked, such as whether they are running, the state of the heart rate (e.g., whether it is in an aerobic range), etc.

In some embodiments, determining a time-state metric includes determining measurements or statistical summaries of measurements when in a particular status, such as a count of the number of times events of a certain type occurred when in a particular state. In some embodiments, the time-state metrics include behavioral measures (e.g., counts, statistics, durations) or metrics for entities calculated in a particular context (e.g., status/states, time periods). Time-state metrics are beneficial to understand behaviors in a variety of applications, examples of which are described below.

Time-State Metrics for Food Delivery

The following is an example of determining time-state metrics in the context of a food delivery service. Suppose a user orders food via the food delivery service via an application such as a mobile app. A stream of event data is generated by a platform associated with the food delivery service, where the event stream includes various event information such as when the order was placed, when the order was received by the restaurant, when the order was picked up for delivery, when the chef started making particular items in the order, whether a modification to the order occurred during making of an item, when the order was delivered, etc. For example, the event stream includes food delivery data that is collected and associated with corresponding date/timestamps.

The following is an example data model for the food delivery example described above. There are various different entities whose behaviors can be tracked, such as the order, each item in the order, the user, the restaurant, etc. For each entity over time, various types of attributes (which may have various types of values) are determined. In various embodiments, attributes that are tracked over time include statuses, events, measurements, etc.

In this food delivery example, different entities may have different types of statuses, events, and measurements. For example, for an order or item entity, example statuses include ready, delivered, prepared, etc. Examples of events pertaining to an order or item entity include whether a modification (a type of event) occurred with respect to the order/item entity. An example of a measurement pertaining to the restaurant entity includes the busyness level of the restaurant. In some embodiments, attribute values (e.g., measurements, status, events, etc.) pertaining to various entities are extracted from event streams.

By evaluating an event stream and tracking attributes for entities over time using such a data model as described above, various time-state metrics related to food delivery may be determined. The following are examples of such time-state metrics for food delivery. As described above, the time-state metrics may be used to understand the behavior of an entity (e.g., user or order) in a contextual manner over time. This allows patterns of behavior for entities to be efficiently determined.

One example type of time-state metric behavior pattern is how much time an entity spent in a certain status. In a food delivery context, this includes, for example, determining how long an order (entity) that is ready (example of status of order) was waiting to be picked up by a delivery driver (where the waiting is another example status).

Another example type of time-state metric behavior pattern is how much time did an entity spend in a particular status when a certain type of event also occurred. In a food delivery context, this includes, for example, determining the amount of delay (duration measure) that was introduced due to a modification (event) to an order (entity). Determining such behavior would allow the food delivery service to understand why delays occurred, and allow them to debug such issues to avoid them going forward.

Another example type of time-state metric behavior pattern is how many occurrences of events of a certain type happened in a given status of an entity. In a food delivery context, this includes, for example, determining what is the number (measure) of modifications (event type) requested before/after the restaurant (entity) started preparing food (status).

Time-State Metrics for Fitness Tracking

The following is an example of determining time-state metrics in a fitness tracking context described above. One example is a fitness tracker that collects fitness data for a user. As one example, the fitness tracker generated an event stream of data indicating various information, such as outputting, over time, stress level, activity status, sleep status, etc. For example, the event stream includes fitness data that is collected and associated with corresponding date/timestamps.

The following is an example data model for structuring event stream data to generate time-state metrics for fitness tracking. In this example, time-state metrics are modeled for an entity, which is the user in this example. Values for attributes of various types are extracted from the event stream from the tracker over time. Examples of such types of attributes include statuses, events, and measurements.

Examples of statuses for the user (entity) include whether they are asleep, stressed, etc. Examples of events include waking up, starting a run, etc. Examples of measurements include heart rate, VO2, etc.

As described above, the various time-state metrics corresponding to different behavior patterns for entities may be tracked using the data modeling and time-state metric computation techniques described herein.

One example time-state metric pattern is how much time did the entity spend in a certain status. In the context of a fitness tracker, this includes determining how long a user (entity) was in deep sleep (status) per day.

Another example time-state metric pattern is how much time did the entity spend in a certain status when an event or status of a certain type also happened. In the context of a fitness tracker, this includes determining how long the user (entity) was in an "aerobic" heart rate range (status) when running (event type).

Another example time-state metric pattern is an (aggregate) measure (e.g., average, peak, minimum, etc.) of a particular attribute when the entity was in a certain status. In the context of a fitness tracker, this includes determining what is the peak heart rate (attribute measure) when the user (entity) was running (also an example type of status).

Another example time-state metric pattern is how many of a certain type of event occurred when the entity was in a certain status. In the context of a fitness tracker, this includes determining how many stress level transitions (where the transitions are examples of a type of event) occurred when the user (entity) was resting (status).

Time-State Metrics for Video Streaming

The following is an example of determining time-state metrics in the context of video streaming. Suppose a client device (e.g., user's smartphone, set top box, gaming device, laptop, etc.) collects video streaming data for video sessions played on the client device. As one example, a video streaming application on a mobile device generates an event stream of data indicating various information, such as the occurrence of events, status changes, quality metrics, etc. in heartbeat messages, where the collected video streaming data is associated with corresponding date/timestamps.

The following is an example timeline data model for structuring event stream data to generate time-state metrics for video streaming. In this example, time-state metrics are modeled for an entity, such as a video session. Values for attributes of various types are extracted from the event stream from the tracker over time. Examples of such types of attributes include statuses, events, and measurements over time.

Examples of statuses or states for the video streaming session (entity) include the player state (playing, buffering, seeking), the current network state of the device (e.g., WiFi vs. cellular), the current delivery service being used (e.g., content distribution network A vs. B), etc. Examples of events include user actions (e.g., play, pause, seek), her player actions (e.g., bitrate level changes), network changes (e.g., switching to cellular), and service provider actions (e.g., switching the content delivery server). Examples of measurements include the current bitrate level, the current state of the player, the current frames per second, network errors if any, etc.

In some embodiments, the different data types that attributes may take are encoded in different types of timeline representations. In some embodiments, timeline objects (generated from observed data values) may be of different timeline types.

As described above, various time-state metrics corresponding to different behavior patterns for entities may be tracked using the data modeling and time-state metric computation techniques described herein.

As described above, one example time-state metric pattern is how much time did the entity spend in a certain status when an event or status of a certain type also happened. In the context of video streaming, this includes determining how much time the streaming session/player (entity) was buffering (status) when using a particular type of network or app (event types).

As shown in the examples above, time-state problems are pervasive in a variety of contexts in which data is collected, example domains of which include fitness, food, video, apps, finance, etc.

Embodiments of the time-state metric generation and computation techniques described herein facilitate the determination of time-state metrics in various types of contexts, allowing for the construction of metrics that are measured in a context that is in terms of time and state, beyond coarse aggregates or counts or averages. Embodiments of the time-state metric techniques described herein facilitate actionable insights contextualized in time and status. As will be described in further detail below, the time-state metrics capture behavior measures of interest for entities that are calculated in a specific time and state context. Example patterns of behavior that are determined using the time-state metrics described herein include:

How much time did the entity spend in Status X?

How much time did the entity spend in Status X when Y also happened?

What is the average/peak/min of measurement V when entity was in Status X?

How many of Type-X event occurrences happened when status of Y was Z?

As shown in the examples described above, time-state metrics such as those described herein are beneficial in a variety of contexts, including fitness, food delivery, video streaming, e-commerce, fintech, apps, automotive domains, etc. The time-state metrics described above, which include behavioral measures of interest calculated in a time/state context, are beneficial for determining actionable insights in a variety of applications.

Embodiments of the time-state metric techniques described herein provide improvements over existing basic summary statistics, which may be too coarse-grained to be actionable. Further, the techniques described herein facilitate the determination of time-state metrics in a manner that is more efficient than existing techniques to determine similar types of actionable insights.

For example, existing data processing techniques are based on a tabular or relational model of computation. Suppose a database and collected data. The collected data is placed in a table. The collected data stored in the database is queried using a structured language such as SQL (Structured Query Language). Such a relational model is beneficial for manipulating and querying tabular data such as individual records in rows, where queries are made to, for example, aggregate properties of a population of interest across a column or multiple columns (e.g., by selecting, grouping-by, filtering, etc.).

However, it is challenging to use such a relational or tabular model of computation, which does not inherently have a notion of time or state, to track event streams over time. For example, implementing time-state metrics such as those described above using an existing relational or tabular model would result in the use of complicated and expensive queries that are prone to errors.

The following is an example of attempting to implement a time-state metric using queries of existing relational or tabular databases. An example involving video streaming is described herein for illustrative purposes.

FIG. 1A illustrates an embodiment of raw measurements from a video session. For example, the raw measurements are events received from a client content player. A visual representation of the events over time is shown in the example of FIG. 1A. Shown in this example are various events such as player state changes, bitrate changes, seek events, and CDN (content delivery network) switches that occur over time.

FIG. 1B illustrates an embodiment of a tabular representation of events. In this example, a tabular representation of the raw events described in conjunction with FIG. 1A is shown. In this example, each row corresponds to a timestamp. The events associated with a given timestamp are populated with corresponding values from the raw event stream. In this example, raw measurements for the attributes such as player state, bitrate, CDN, and seek are shown.

In this example, the collected raw events have been stored in a table. The table in this example includes various columns, such as a timestamp column. The columns also include columns for attributes present in the raw event data, such as a player state column, a bitrate column, a CDN column, and a seek column. For each event type, a column is created, where values for the various types of events are stored in the appropriate locations within the table (e.g., appropriate column at cell corresponding to associated timestamp).

Suppose that in this video streaming scenario, the following metric is desired to be determined:

How much time did a session spend in a connection-induced rebuffering state while using CDN C1?

Such a metric is an example of a time-state metric, where a measure of a duration of time in a specific context is to be evaluated. For the measure of duration, the temporal and state context includes four sub-components, such as that the player is in a buffering state, the player had already started playing, the user has not recently seeked, and CDN C1 is being used.

That is, in order to determine this time-state metric, a count of duration (example of a measure) is determined while in the context of the following four conditions:

1. Currently buffering &&
2. Play has already initialized &&
3. User has not seeked in last 5 seconds &&
4. Using CDN C1

As shown in this example, determination of the time-state metric is dependent on multiple conditions, where determination of when the conditions are met is based on the tracking of the occurrence of multiple types of events that may be occurring at different times, and are separated over time.

Given the tabular representation of the raw event data shown in the example of FIG. 1B, in order to generate the connection-induced rebuffering measure given the desired context/state, a complex combination of queries would need to be implemented to ensure that the metric is computed only in the appropriate context, which includes numerous conditions, each of which may be complex to compute in a relational of tabular model.

For example, consider the first state component: that the player was currently buffering. FIG. 1C illustrates an embodiment of data to be determined. In this example, to determine the duration of buffering, a query would have to be written to determine the time when the player was in the buffering state (e.g., condition 1 above). As shown in this example, this would involve scanning the values of the player state column, and determining the amount of time that the player was in the buffering state, which in this example includes determining the sum of t4–t1, t6–t5, t9–t8, and t14–t12, all of which are non-contiguous entities. As shown in this example, the value for the player attribute is only provided when the player changes state, where the player attribute value is only populated for specific timestamps.

Thus, determining the amount of time that the player was within a specific state requires a number of queries to be written (e.g., to find the timestamp when the player==buffer, to find the next point in time when a change in the player value occurred, and then finding the difference between the two timestamps, repeating such processing, and aggregating such time periods in which the player was in the buffer state).

In this case, it would be beneficial to model time in a table, as well as model differences in time when a particular state is occurring. However, existing relational or tabular techniques provide insufficient mechanisms to do so, resulting in complex, time-consuming, and error-prone query code.

In addition to generating a complex query to determine the above player state, given the desired constraints/state, furthermore, the buffering state before the first play would have to be ignored (to satisfy condition 2 of the context, which is that the player has already initialized), which would in turn involve writing a complex query to track whether play has started, and ignoring buffering (as every player will buffer at start). That is, further code would need to be written to discount buffering before play started. Doing so in a code language such as SQL code is challenging, as there is not a mechanism by which to track the play state, and remove the buffering before the play. That is, in a tabular or SQL-like model or language, it is difficult to express such intents.

FIG. 1D illustrates an embodiment of determining a time-state condition. In this example, determining when CDN C1 was being used (e.g., condition 4, above) is shown. As shown in this example, it is desired to be able to track when C1 was in use. While the tabular representation can be queried to determine in which rows the CDN column value was equal to C1, it is more challenging to determine the collection of rows (timestamps) or interval in which the CDN was C1 until switching occurred.

As shown in the above example, determining time-state metrics using tabular representations of collected event data is challenging, as, for example, determining intervals or periods in which a system is in a certain state can be challenging. Further, it can be complex to determine logic when multiple conditions are present in the desired time-state metric and are to be combined.

FIG. 1E illustrates an example of an SQL query. In the example of FIG. 1E, a complex SQL query to implement the time-state metric above (with four conditions) is shown. The complex queries result in inefficient computation, in particular, if being scaled for numerous video-playing sessions and many time-state metrics. That is, there is significant compute effort to implement time-state metrics when the data is maintained in a tabular or relational model. Further, significant effort is needed to develop and debug such code, in which there may be difficult to discern semantic errors.

The following are embodiments of techniques that facilitate efficient configuration and computation, at scale, of time-state metrics, which are usable to determine state and behavior of a system in context. The techniques described herein provide various benefits over existing data processing tools that are based on tabular frameworks. Using embodiments of the time-state framework or model described herein, the evolution of attributes over time is modeled in what is referred to herein as a timeline representation, facilitating efficient configuration and computation of time-state metrics. Modeling the evolution of attributes includes tracking values of attributes over time, rather than, for example, at specific points in time. Further, the techniques described herein include computational operations that operate on the timeline representations described herein, where such timeline operations are used to determine how attributes change in relation to other variables, events, and entities. This includes determining, for example, the evolution of a column, and then also understanding the evolution of that column in the context of other columns, which are also evolving over time. The techniques described herein further allow understanding of group and aggregate behaviors over an entire population, as well as over windows of time. This is an improvement over existing tabular or time series models, which do not track such stateful evolution over time, or require high computational cost and effort in order to implement such a class of time-state analytics. Compared to existing relational-based systems, the techniques described herein are more flexible and efficient.

In addition to being more computationally efficient as compared to existing data processing techniques, the techniques described herein facilitate configuration of time-state metrics without requiring coding or writing SQL or other types of code.

The following are embodiments of modeling and computing time-state analytics. Embodiments of the time-state analytics techniques described herein include a number of components, including system architecture and integration of time-state metrics, further details of which will be described below.

Time-state analytics are a class of big data computation problems for actionable insights that require stateful context-sensitive processing over event streams. As shown in the examples above, time-state analytics are important for a variety of applications. For example, in video streaming, many quality of experience (QoE) metrics such as connection induced buffering, exit before start, average bitrate, etc. are stateful and context-sensitive, falling under the time-state analytics class of computational problems.

Described herein are embodiments of a specialized data/compute model for supporting time-state analytics. Embodiments of the data/compute model are also referred to herein as a timeline model implementation. When determining time-state analytics, the timeline processing techniques described herein provide improvements over existing data processing systems, which are based on legacy tabular, relational, or SQL computation models. The timeline processing techniques described herein support fine-grained metrics in real time, at scale. As described above, example benefits provided by the timeline processing techniques described herein include providing actionable fine-grained metrics at reduced cost, with reduced development time, and increased visibility and clarity.

While embodiments of timeline processing and time-state analytics are described below in the context of video streaming, the techniques described herein may be variously adapted to accommodate any other type of time-state metrics as appropriate.

System Architecture

Figure 2:
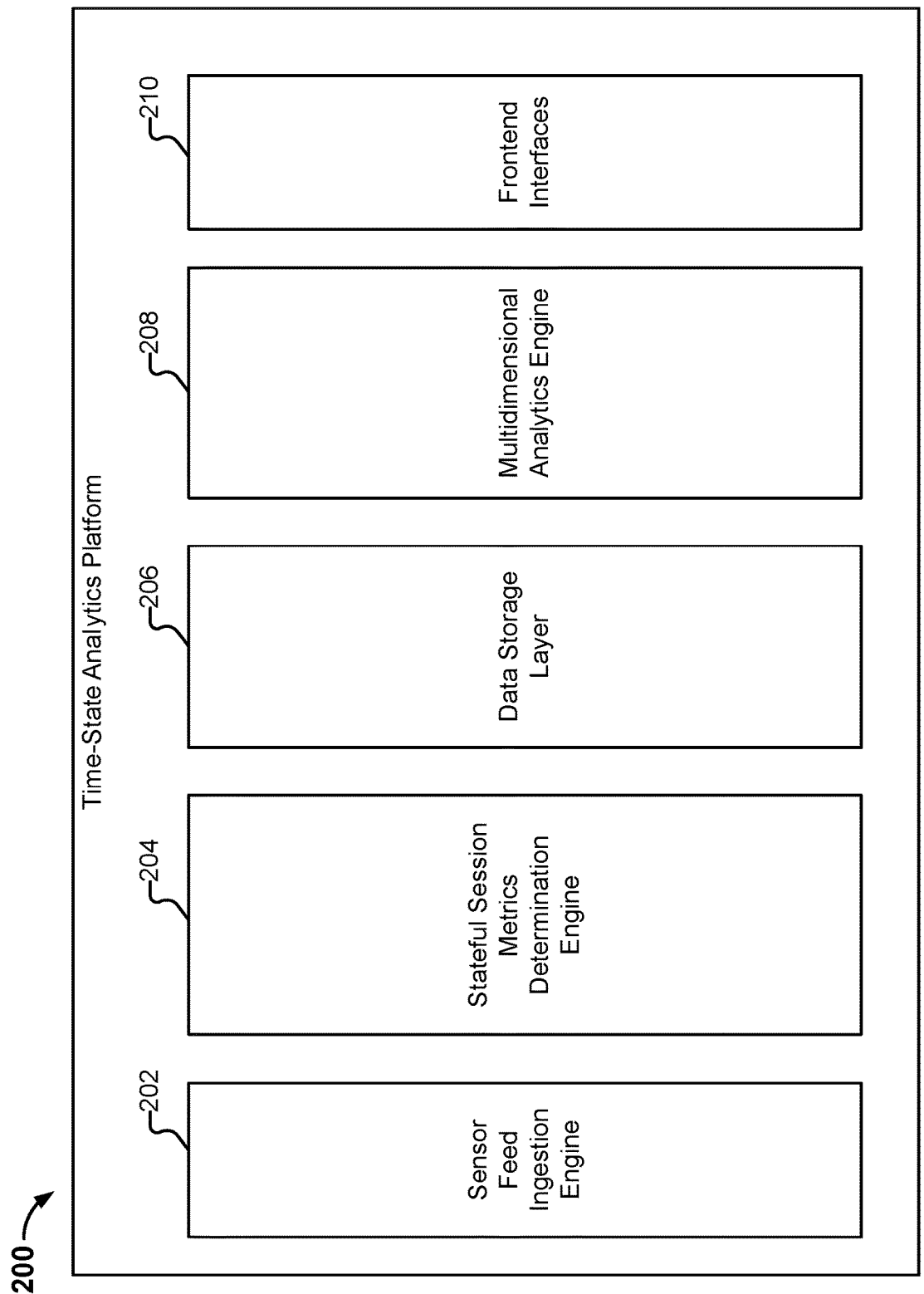
FIG. 2 illustrates an embodiment of a system for performing time-state analytics.

FIG. 2 illustrates an embodiment of a system for performing time-state analytics. Embodiments of queries to the timeline processor described herein include two components-types of metrics of interest, and types of dimensional aggregations to be performed. For example, a query may include an intent to understand aggregate properties of a stateful metric in the context of some metadata. Embodiments of the time-state analytics platform described herein support stateful metrics, as well as dimensional summarizations.

In this example, time-state analytics platform 200 includes a compositional system architecture. In this example, sensor feed ingestion engine 202 is configured to ingest feeds or streams of sensor data from client devices. In the example of video streaming, content players on various devices (e.g., laptops, mobile phones, tablets, desktops, set-top boxes, game consoles, etc.) are configured to stream sensor data (collected by the content player for a video streaming session) to platform 200. For example, various event data or values measured by the content player are transmitted in messages that are transmitted to platform 200 over a network such as the Internet.

Stateful session metrics determination engine 204 is configured to determine stateful session metrics (e.g., time-state metrics) on the feed of sensor data ingested by ingestion engine 202. In some embodiments, stateful session metrics determination engine 204 is configured to convert the stream of raw session data, which may include measures and events collected for multiple types of attributes, into timeline representations of attributes. In some embodiments, the timeline representations for attributes are updated as new values for the attribute are ingested. Further details regarding conversion of a stream of ingested values of an attribute into a timeline representation of the attribute are described below.

In some embodiments, stateful session metrics determination engine 204 is further configured to determine time-state metrics by applying a set of timeline operators on the timeline operations. This includes logically combining timeline representations of multiple attributes in order to determine the context in which a time-state metric is computed. Further details regarding timeline operators and combining of timeline representations to compute a time-state metric are described below.

In some embodiments, the time-state metrics that are computed (e.g., for a video streaming session) by stateful session metrics determination engine 204 are stored to data storage layer 206.

In some embodiments, a time-state metric is computed for events that are included within a certain scope. One example of such a scope is a streaming session (e.g., in the context of video streaming). In some embodiments, time-state metrics are determined on an individual session-level basis. In some embodiments, analytics on cohorts of sessions may be of interest. For example, an individual session is associated with a set of metadata dimensions, such as the ISP (Internet Service Provider, such as Comcast, AT&T, etc.) of the session, the operating system of the session (e.g., iOS, Android, etc.), device type, etc. In some embodiments, multidimensional analytics engine 208 is configured to perform aggregations or rollups on groupings of metrics that share a set of dimensions.

In some embodiments, time-state metrics and aggregations of such time-state metrics are provided as output of platform 200 via frontend interfaces 210.

In this example system 200, a system decomposition is shown in which stateful session metrics are computed when sensor feeds come in, and where multidimensional analytics are performed in a backend. In this example, there is a form of decoupling of the two tasks of determining stateful session metrics and determining multidimensional analytics. In this example, state session metrics are precomputed, with multidimensional analytics performed on the backend. In some embodiments, the time-state metrics are computed in real-time, as a stream of data is ingested. In other embodiments, the timeline representation conversion and manipulation to determine time-state metrics is performed as a batch process (e.g., as a backend process, not only during streaming).

Timeline Representation Transformation and Time-State Metric Computation

The following are embodiments of computing stateful session metrics. In some embodiments, the computing of stateful session metrics is based on embodiments of the timeline data/compute model for time-state analytics described herein. Using the timeline data structure and computation models described herein, data is processed as a timeline, allowing for modeling of attributes with values that vary over time. As will be shown below, the use of such a timeline data structure and computation model as described herein facilitates the intuitive configuration of queries and metrics, reduces development effort, and allows for various optimizations to reduce resource usage.

In some embodiments, time-state metrics are computed based on timeline representations of attributes. The timeline representations of attributes represent the change in state of values of attributes over time. The timeline representation of an attribute is generated by transforming the raw event data collected for an attribute (which is indicated at points in time, or timestamps) into a state representation that models the change in the values of the attribute over spans of time. In some embodiments, time-state metrics are computed on a session level. For example, raw events for a session are collected. The raw events collected for a session are transformed, using operators, into timeline representations of the changes in values for attributes during that session. A session-level time-state metric is then computed by using a set of timeline operators on the generated timeline representations of one or more attributes, further details of which will be described below.

Figure 3:
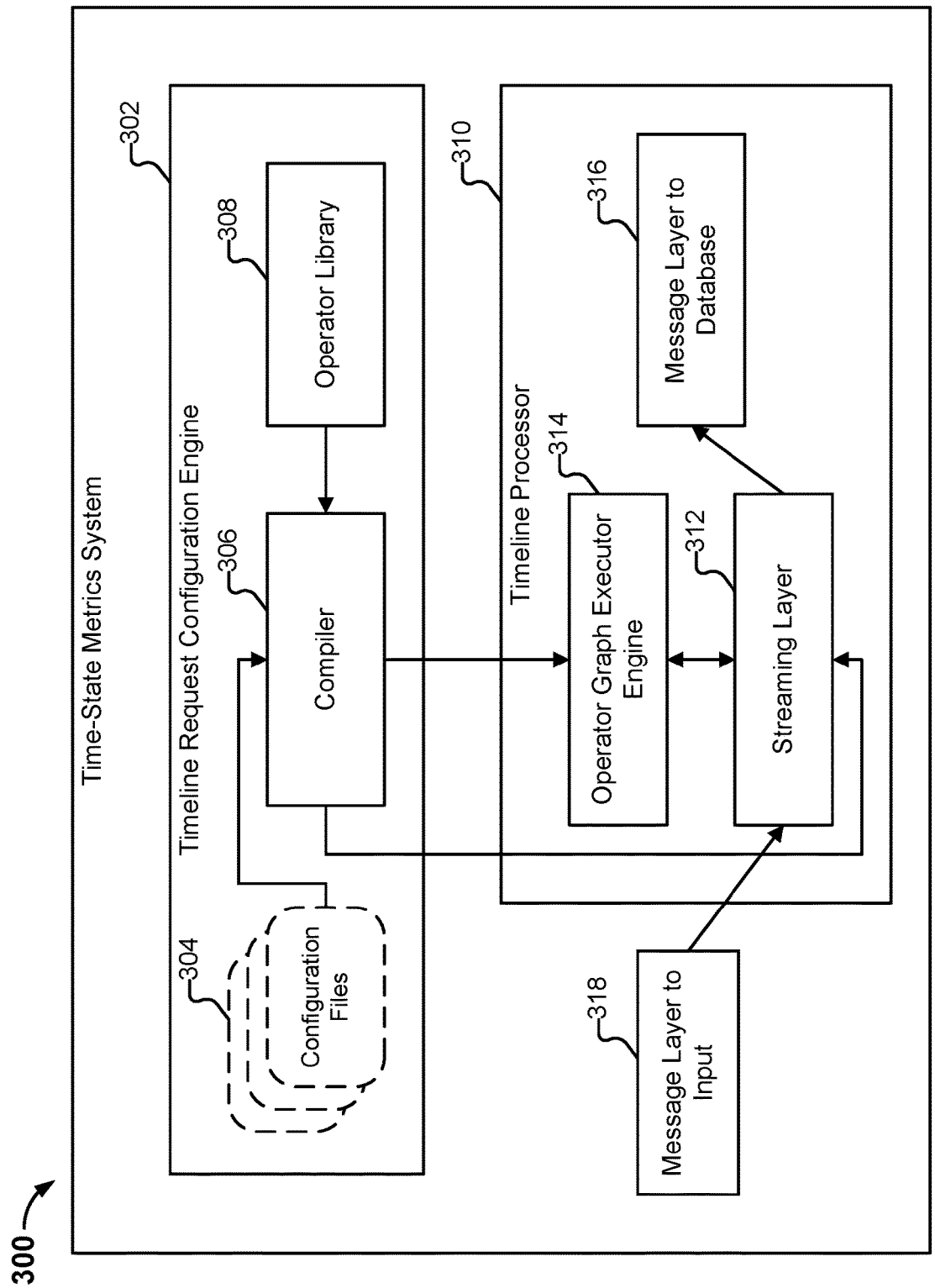
FIG. 3 illustrates an embodiment of a system for determining time-state metrics.

FIG. 3 illustrates an embodiment of a system for determining time-state metrics. In this example, time-state metrics system 300 is an embodiment of stateful session metrics determination engine 204.

In this example, time-state metrics system 300 includes timeline request configuration engine 302 and timeline processor 310. In this example, timeline request configuration engine 302 includes configuration file(s) 304, compiler 306, and operator library 308. In this example, timeline processor 310 includes streaming layer 312, operator graph executor engine 314, and message layer (to database) 316. Further details regarding time-state metrics system 300 and its various components are described below.

In some embodiments, the timeline processor 310 is configured to implement time-state operators and time-state data structures and model representations. In various embodiments, this includes generating timeline representations of attributes and computing time-state metrics by applying a chain of timeline operators. In some embodiments, the timeline processor is implemented using programming languages such as Scala, Rust, etc. In other embodiments, the timeline processor is implemented as an application programming interface (API) on top of existing analytics databases. Other implementations may be utilized, as appropriate.

In some embodiments, the timeline processor takes as input a data stream (e.g., via message layer to input 318), computes time-state metrics, and outputs the time-state metrics to a database.

In this example, the input data stream (e.g., ingested via message layer 318, which is an example of sensor feed ingestion engine 202) includes session data provided in the form of heartbeats, which as one example is implemented in a format such as JSON (JavaScript Object Notation). In some embodiments, the stream is from a source such as Amazon S3, where the stream is processed through the timeline processor.

In some embodiments, the timeline processor receives as input a timeline request configuration from configuration files (304). In some embodiments, the timeline request configuration is a configuration file for individual time-state metrics. Different metrics may be written for processing the data, where each different metric is associated with a corresponding timeline request configuration file. The time-state metrics are to be computed on the stream of raw data received for a session. An ensemble of multiple time-state metrics may be configured to be computed for the session.

In some embodiments, the time-state metric configuration files are consolidated through compiler 306. For example, the system includes an operator library through which metrics are written. In some embodiments, a time-state metric is implemented as a collection of timeline operators that are applied and combined in a particular sequence. In some embodiments, each time-state metric is represented as a graph, such as a DAG (directed acyclic graph). The collection or ensemble of DAGs is provided to the compiler. The compiler, based on the DAGs, refers to the operator library to obtain the code needed to execute the operators specified on the DAGS.

In some embodiments, to execute a time-state metric (e.g., apply a DAG for every session that comes in), the compiler reads the configuration file for a time-state metric. The compiler then instantiates code to execute the graph of operators that form the time-state metric. The compiler synthesizes code for the DAG runtime to execute. For example, the compiler follows the timeline operator graph, identifies the operators to be performed in sequence, as well as retrieves the code for executing the operators and includes any specified operator parameters. For example, the compiler instantiates runtime objects for the runtime to execute. In some embodiments, the runtime has implementations of the operators in a time-state metric configuration.

In some embodiments, the timeline configuration file is in a machine-readable format such as YAML. As one example, the configuration is in a JSON format. In some embodiments, the configuration file is the output of an editor, such as a visual UI (user interface) editor used by a metric-designer to configure a time-state metric.

In this example, the compiler generates the runtime code corresponding to the DAG representation specified in the timeline configuration file. The operator graph executor engine 314 (also referred to herein as a DAG executor) is configured to execute the code provided by the compiler. The DAG executor is applied to data processed by the streaming layer 312, which is configured to receive a stream of raw data. For example, there is a message queue (e.g., message layer to input 318) that takes heartbeats and ingests them into the system. For example, the message layer is configured to stream raw data into the platform. For example, the DAG executor is configured to traverse the nodes of the DAG, and execute the operators at each node according to the parameters and specification of the node (e.g., input arguments, parameters, etc.). Further details regarding graphs of timeline operators used to implement a time-state metric are described below.

In some embodiments, the streaming layer 312 is configured to support complex event processing by performing various tasks such as fault tolerance, checkpointing, watermarking, etc., or any other data quality processing as appropriate. For example, in the real-world, events may not always arrive in sequence due to network delays, failures, data drops, etc. The streaming layer provides a canonical or cleaned up stream of event data that the DAG executor runs on.

In some embodiments, every heartbeat of raw data that is ingested passes through the DAG of operators, end-to-end. For example, the time-state metric is updated for every heartbeat (or message with a set of raw event data). In some cases, the heartbeat may not have events that are of interest to the time-state metric, and may in part be ignored (where the value of the heartbeat may not be changed, since the raw data is not of interest to the operators in the time-state metric and computations are not performed on them, although the span of a timeline may be updated to extend the span range in some embodiments, further details of which are described below).

In some embodiments, the input to an operator is a timeline, and the output of a timeline operator in the operator library is a timeline. In some embodiments, the output provided to the database is in a format that is appropriate for the output database. For example, the message layer to the database is configured to translate or convert the timeline output of the time-state metric into a format applicable to the output database. This includes encoding information in formats acceptable by the output database.

In some embodiments, the message layer to database 316 is configured to format time-state metric outputs into an output database. In some embodiments, the message layer also performs summarizations. For example, for a session, it may be desired to have a value of the metric on a periodic basis, such as every minute or every thirty seconds. In some embodiments, when reporting the session to the database, a summary is generated based on aggregated session value metrics and converted to a format applicable to the database. In this example, what is reported to the database is a "real-time" metric, where the current value of the metric is reported according to some frequency or period. Another example type of metric that is reported is an end-of-lifetime metric. For example, at the end of a session, values for the time-state metrics that were applied are reported to the database.

In some embodiments, the messaging layer is an interface to an output database that is configured to report the results of the time-state processing. In some embodiments, the interface is configured to determine, for a metric, what to report based on the time-state metric value, when to send the report, how to package the report, etc.

The following are embodiments of determining what output data is to be sent. In some embodiments, not only the final result of the metric is provided as output. For example, any node in a DAG (not only the final node) may be tapped, and the corresponding data from that node provided as output.

As one example, suppose that the output of the final node in the DAG is tapped into. The output of the time-state metric may be values, as well as timelines themselves (if supported by the database).

The following are embodiments of determining when to send or transmit output based on a computed time-state metric. In some embodiments, the results of the metric, which are being applied to data as it is ingested, are used to generate an updated value over time as well. The output of the time-state metric may be provided at the end of a session. The values generated by the metric may also be reported periodically to the database (e.g., every thirty seconds). Metric values may also be provided on demand, as the session raw data is streaming in and processed in real-time.

In some embodiments, the processing described herein occurs in a streaming layer, in real-time, operating on raw event data that is being ingested and collected.

As described above, the context in which a metric is computed may be based on the combination of measured attributes being in certain respective states. In some embodiments, metadata associated with a session (whose stream of raw data to which the time-state metric is being applied) is stored along with the metric values. For example, when the time-state processor performs a computation on raw data corresponding to time t=X, the time-state processor generates an output value corresponding to time t=X. A row with a timestamp corresponding to t=X is sent to the database with the metric value computed at that timestamp along with metadata describing the session whose raw sensor data the time-state metric was applied to.

If multiple metric values are being computed, then, for example, the output row includes multiple columns, one for each type of metric. Each row corresponds to a particular timestamp, and the output values computed for the various time-state metrics for that timestamp are included as column values in the row of data provided to the database.

In some embodiments, aggregations or rollups can be performed to aggregate information across different time windows. For example, providing output values as they are computed for every time step may be resource intensive. In some embodiments, samples of time-state metric values (which are potentially being updated as new session raw data is received) may be provided periodically. Rollups can also be performed to determine, for example, averages of the output of a time-state metric, where the average is delivered periodically. This is an example of providing a summary of the metric value. In other embodiments, raw timelines are provided as output to the database. As another example, the time-state metric data structure representation is sent to the database.

In some embodiments, the reported data is packaged as raw data or sent in a "session summary"-like data structure composed of the session attributes and the associated time-state metrics of interest.

In the above example of FIG. 3, the timeline processor facilitates the use of timeline data models in existing data-processing systems. In some embodiments, the timeline processor is configured to translate the events stored in the system's original format to one or more timeline objects/representations. In some embodiments, producing a timeline object includes determining an encoding of an input and identifying the timestamp or time range associated with each piece of incoming data.

The timeline processor is configured to then apply timeline operators. In some embodiments, the timeline operators are selected from a timeline library of pre-defined operators.

The timeline processor is also configured to translate the resulting timeline objects to another data format appropriate for exporting. In some embodiments, digesting or translating the timeline objects includes calculating final outputs (e.g., stateful metrics such as connection-induced rebuffering) by evaluating final timeline object data at specified timestamps or time ranges. In some embodiments, digesting timeline objects includes encoding and exporting results of timeline data evaluation in a format appropriate for downstream consumers (e.g., tables, summary statistics, etc.).

Example Time-State Metric Determination

The following is an example of computing a time-state metric. In some embodiments, the processing described in this example is implemented by time-state metrics system 300 of FIG. 3.

In this example, suppose that the following time-state metric is to be computed for each video session:

How much time did each video session spend in connection-induced buffering when using Cellular?

In this example, the amount of time that the video session spent in buffering is determined within the context of when the player was using cellular.

Suppose the following received heartbeats that are streamed from a content player, where heartbeats are sent out including sensor data that is measured for various attributes:

{"timestamp": "1", "UserID": "U1", "SessionID": "S1"; "Bitrate": "720p", "Network": "WiFi", "Player": "Init"}

{"timestamp": "3"; "UserID": "U1", "SessionID": "S1", "Player": "Init"}

{"timestamp": "7", "UserID": "U1", "SessionID": "S1", "Bitrate": "1080p"}

{"timestamp": "8", "UserID": "U1", "SessionID": "S1", "Network": "Cellular"}

{"timestamp": "10", "UserID": "U1", "SessionID": "S1", "Player": "Buffer"}

{"timestamp": "12", "UserID": "U1", "SessionID": "S1", "Bitrate": "480p", "Player": "Buffer"}

{"timestamp": "14", "UserID": "U1", "SessionID": "S1", "Player": "Play"}

. . .

As shown in this example, an arbitrary sequence of events or raw or observed or reported data values is received.

While in this example, a heartbeat is shown corresponding to a certain timestamp, in some embodiments, heartbeats are batched together and may include multiple heartbeats, each corresponding to some particular time (indicated by a timestamp).

Timeline Representation of Raw Measurement Data

In order to determine the duration metric described above, two durations or ranges of time are to be determined. The first duration is the span(s) of time in which the player was in the buffering state. The second duration to be determined is the span(s) of time in which the network was in the cellular state. The end-to-end or overall duration is the amount of time in which the player being in the buffering state overlaps with the network being in the cellular state. That is, the final duration of interest is the amount of time in which the player is in the buffering state AND the network is cellular.

In order to determine the time-state metric, two durations are to be determined: (1) when the player is in the buffering state; and (2) when the network is in the cellular state. A logical AND operation is performed to determine the overlap in time, which in turn is used to determine the final duration metric value.

The following is an example of determining the portion of the context state that corresponds to "when using Cellular." This includes modeling when the player was using a cellular network (versus, for example, WiFi).

Figure 4A:
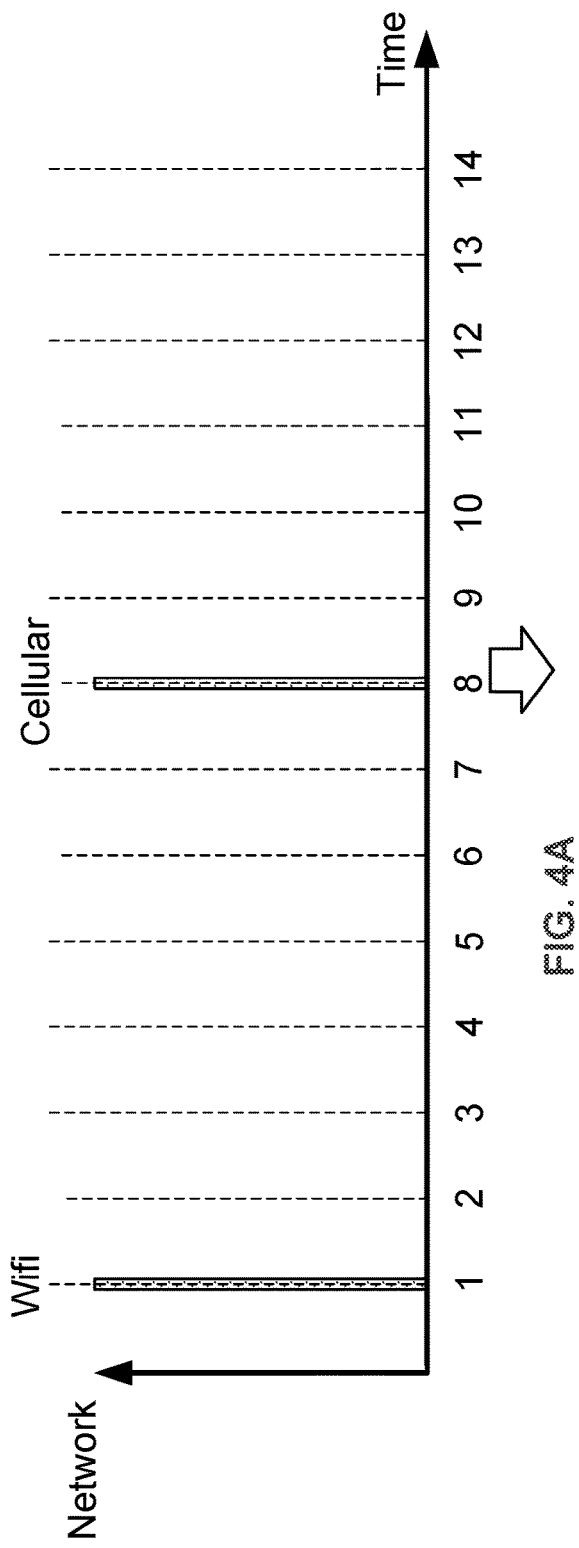
FIG. 4A illustrates an embodiment of a visualization of discrete events.

In this example, the network events are extracted from the above example raw data for the session. FIG. 4A illustrates an embodiment of a visualization of discrete events. In this example, a visualization of the values of the network attribute at their corresponding timestamps in the raw event stream is shown.

Figure 4B:
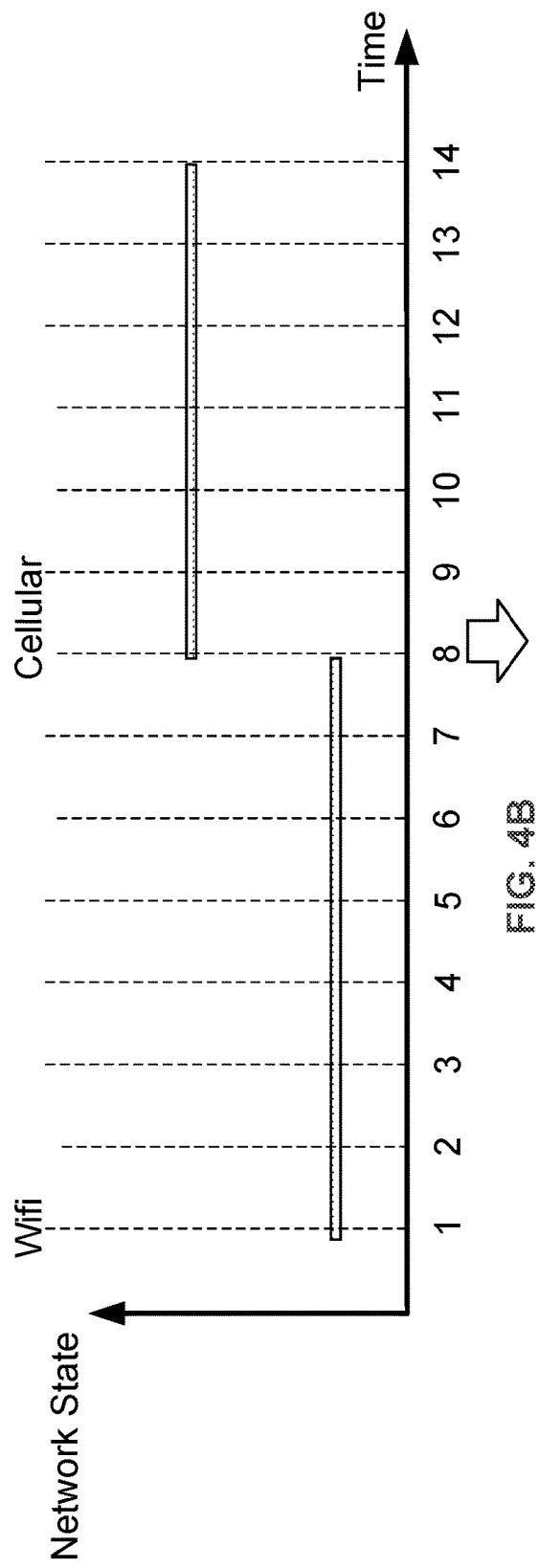
FIG. 4B illustrates an embodiment of a timeline representation of an attribute.

While the value of the network attribute is shown at selected points in time that correspond to when a sensor measurement (determination of network state) was transmitted, it would be beneficial to determine a timeline of when the player was using WiFi or Cellular. FIG. 4B illustrates an embodiment of a timeline representation of an attribute. In this example, the raw network event data is passed through a timeline operator that reconstructs the "network state" of when the player was using WiFi or cellular. In this example, the player transitioned to cellular at timestamp=8. In this example, a state timeline of the status of the network being used is constructed. As shown in the example of FIG. 4B, the network state is now modeled as spans of time in which the network state was a certain value (rather than at discrete points corresponding to timestamps in the raw data).

In the example of FIG. 4B, the network state over time is constructed, where in this case, the network state is either cellular or WiFi. With respect to the metric under consideration, the particular context with respect to network state of interest is whether or not the network state was cellular. As shown in this example, the discrete network events have been transformed into a state function over time.

In this example, to facilitate determination of when the network state was cellular, as well as to facilitate combining with the other context to be determined (when the player was buffering), the network state timeline of FIG. 4B is passed through another timeline operator to generate a new Boolean timeline representation/model whose value is either True (corresponding to when the network state is cellular) or False (corresponding to when the network state is not cellular). For example, a timeline operator is utilized on the timeline of FIG. 4B, where a True/False value is assigned based on whether the network state value for a span of time was Cellular or WiFi. FIG. 4C illustrates an embodiment of a timeline. As shown in the example of FIG. 4C, the timeline of FIG. 4B is evaluated to determine that "Is Using Cellular?" is true after timestamp t=8, and false prior.

As will be shown below, transforming the raw network events to a True/False timeline facilitates manipulation of multiple timelines in order to determine the overall time-state metric of interest.

The following is an example of determining the portion of the time-state metric context that corresponds to connection-induced buffering.

FIG. 5A illustrates an embodiment of events at discrete points in time. The example plot of FIG. 5A visualizes the value of the player events at times corresponding to timestamps in the received raw data above.

FIG. 5B illustrates an embodiment of a player state timeline. In some embodiments, the player state timeline representation is constructed from raw player events extracted from the raw event data received in heartbeat messages. In this example, the player events have been converted to states, where the player state is represented via spans of time in which the player has a certain state.

In order to facilitate determination of the final duration metric, the timeline of FIG. 5B is further converted into another Boolean timeline that indicates whether the player is in the connection induced buffering state.

In this example, the new timeline has Boolean values of either True or False (whereas there were at least three different player states). In this example, the player state timeline is passed through another timeline operator to generate the new Boolean timeline representation/model of FIG. 5C, whose value, for a given span of time, is either True (corresponding to when the player state is buffering) or False (corresponding to when the player state is anything other than buffering).

Figure 5C:
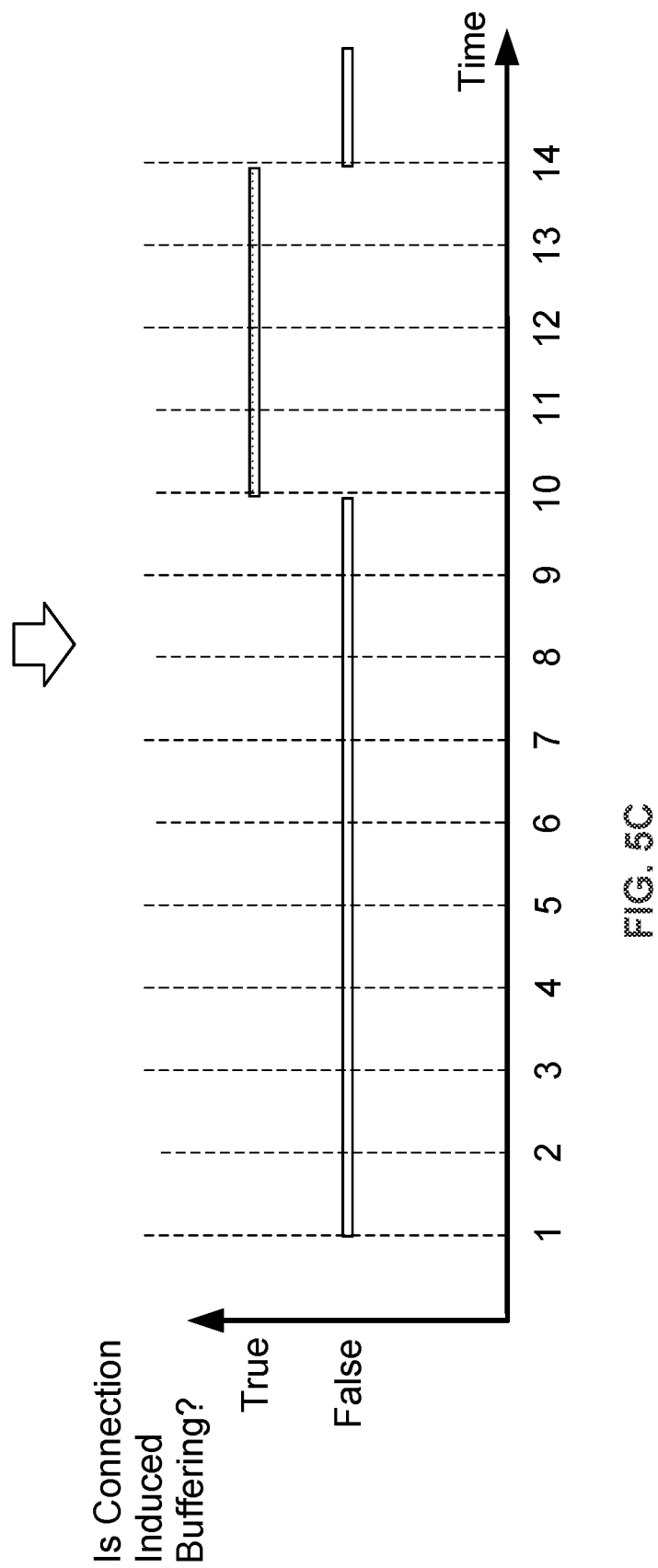
FIG. 5C illustrates an embodiment of a Boolean timeline.

As shown in the example of FIG. 5C, the timeline of FIG. 5B is evaluated to determine that "Is Connection Induced Buffering?" is true between timestamp t=10 to timestamp t=14, and false otherwise (in the time range of timestamp t=1 to t=15).

The following is an example of determining the end-to-end metric, which is the duration of time when conduction-induced buffering and using cellular are performed. In this example, to determine the time-state metric, first the context is determined. In this example, the context is connection-induced buffering when using cellular. In order to do this, the player state and the network state are combined via a logical AND operator. For example, the timelines of FIGS. 4C and 5C are combined by applying a logical operation (AND) at each point in time.

Figure 6A:
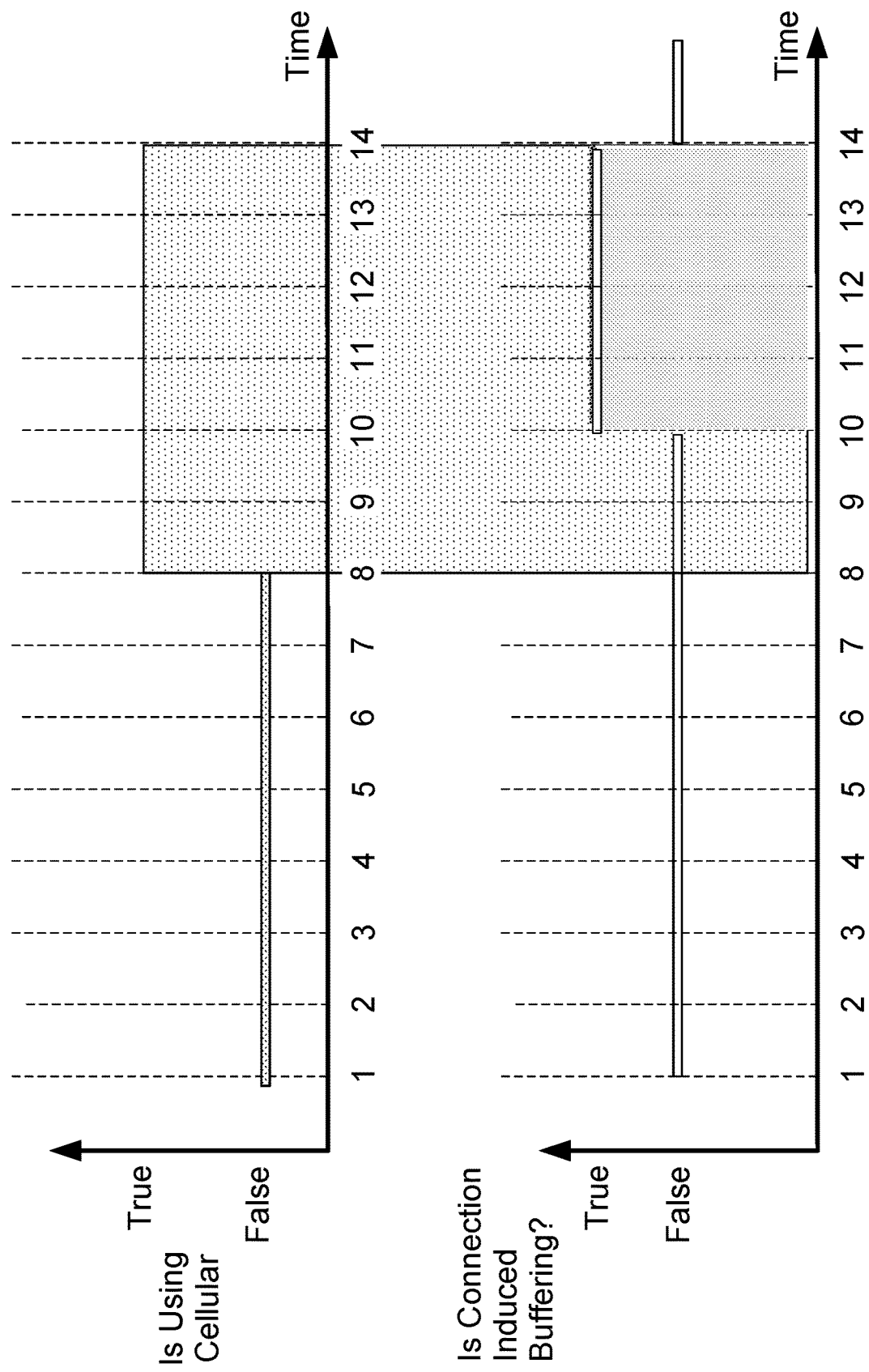
FIG. 6A illustrates an embodiment of manipulating timeline representations of attributes.

The following is an example of using timelines to efficiently determine the context by manipulating timeline representations of attribute/variable states. FIG. 6A illustrates an embodiment of manipulating timeline representations of attributes. As shown in the example of FIGS. 4C and 5C, Boolean timeline representations were generated from the raw events. In the example of FIG. 6A, the Boolean timelines corresponding to "Is Using Cellular" and "Is Connection Induced Buffering?" shown in FIGS. 4C and 5C are reproduced. In this example, by generating Boolean timeline representations for the context of interest, the overall context is determined by determining when both timelines were equal to true.

In this example, the timelines of FIGS. 4C and 5C are ANDed together to generate a new timeline representing when there was connection-induced buffering AND when the player was using cellular. FIG. 6B illustrates an embodiment of a context timeline. As described above, the context timeline of FIG. 6B is the AND of the timelines of FIGS. 4C and 5C. In this example, the timelines of FIGS. 4C and 5C have been combined by applying a logical AND operation at each point in time.

Now that a timeline representation of the overall context has been determined (e.g., when the overlap in time was true), the metric of duration is computed as the summation of the duration where the overlap was true. In some embodiments, the duration is determined using the context timeline representation of FIG. 6B. In this example, the summation is represented also as a timeline. FIG. 6C illustrates an embodiment of a duration timeline. As shown in the example of FIG. 6C, if the value of duration were measured at time t=4, then the duration value will be 4 seconds spent in buffering time when also using cellular. The timeline representation of FIG. 6C is generated by determining the cumulative duration of where the state of the input timeline (that of FIG. 6B) was True.

As shown in this example, a time-state metric is computed by manipulating timeline representations of attributes. Generating the time-state metric includes the user of various operators to implement the various desired logical functions. As shown in the above example, in order to determine the end-to-end metric of connection-induced buffering when using cellular, a logical overlap of the buffering Boolean timeline of FIG. 5C and the network Boolean timeline of FIG. 4C was determined. Computing the end-to-end duration metric then in turn involves determining an integral of the combined buffering/network timeline.

In some embodiments, time-state metrics are specified through the use of various operators. In some embodiments, the operators are included in a library of operators such as operator library 308.

As shown in this example, events were converted to timeline representations. The timeline representations were then passed through a sequence of timeline operators. For example, the timeline operators take timelines as input and generate output timelines. Some timeline operators also take multiple timelines as input and combine them into one or more output timelines, which may in turn be fed as input to yet other timeline operators. As shown in this example, to determine a time-state metric, raw events are converted to timeline representations and then passed through a chain of timeline operators that are applied in a sequence (e.g., graph of operators as described above).

One example type of operator is one that manipulates raw event data into timeline representations of states. Another example type of operator is one that manipulates the timeline representation of states into a manipulatable timeline representation (e.g., to define Boolean values conditioned on a desired logical operator). Further operators for determining certain types of metrics over time (e.g., duration) are also included. The various types of operators thus provide an efficient mechanism by which to create compact queries for desired time-state metrics.

In some embodiments, the specification of specific operators is composed based on the type of attribute to be converted. For example, to determine the player state Boolean timeline of FIG. 5C, a first operator is used to extract the raw player state events and generate the player state timeline representation of the player attribute of FIG. 5B. To generate the Boolean timeline representation, the timeline representation of FIG. 5B is passed through a logical operator which is configured to determine, over time, when the value of the player attribute is equal to buffer. If the value of the player attribute at some time was equal to buffer, then the output value for that time is set to True. If the value of the player attribute at that time was not equal to buffer, then the output value for that time is set to False. Applying the logical operator over the timeline of FIG. 5B results in the timeline of FIG. 5C.

In this example, the use of timeline representations provides various benefits. Such benefits include more efficient manipulation of data to determine complex state over time, as well as more intuitive visualization of data over time. The use of the representations described herein also simplifies the set of operations used to compose define complex time-state metrics, as compared to using existing relational or tabular techniques.

As shown in the above example, determining a time-state metric from raw events includes multiple components. One component is a data structure/model in which raw events are converted into timeline representations. The timeline representation is a data model for data that appears in time-state problems, such as events, step functions, and measurements. A second component is a computation model which includes executing various operators to manipulate such timeline representations (e.g., combine them) in order to determine the end-to-end time-state metric of interest.

In some embodiments, the computation model includes what are referred to herein as time-state operators. In some embodiments, time-state operators are configured to take as input one or more input timelines, and produce as output one or more output timelines, according to the specification of the time-state operator. The timeline operators of the computation model are configured to manipulate the aforementioned timeline representation, and provide an efficient mechanism by which to express logic that would be more difficult to implement in tabular models such as SQL.

The following are further embodiments regarding time-state operators. As described above, time-state operators are used to manipulate time-state timelines to construct metrics. In some embodiments, time-state operators are configured to take as input one or more timelines, apply one or more transformations, and produce one or more output timelines.

In some embodiments, a configuration of a time-state metric involves specification of a chain of time-state operators to be applied in a particular sequence. For example, the time-state operators are primitives from which time-state metrics are composed. In some embodiments, a compositional language is provided that allows users to combine the aforementioned operators into a directed acyclic graph (DAG) to implement the desired or intended time-state metric.

One example type of operator is to extract a field or attribute from a heartbeat and add a field or attribute value to a timeline representation of the attribute. As one example, to generate the timeline representation of FIG. 4B, an extraction operator for the network field/attribute is executed. In the example of heartbeats in the JSON format, the network extraction operator is configured to identify the network key in the heartbeat message (e.g., as it is ingested) and extract the corresponding value for that key name.

The extracted attribute value is then added to a timeline representation for the attribute. For example, network values are extracted from heartbeats and added to a network timeline.

The following are embodiments of a timeline representation of an attribute. In some embodiments, raw events are converted into a timeline representation. For example, the raw event values are encoded as spans. In some embodiments, the timeline representation includes a representation of the states (e.g., corresponding to different values) that an attribute can be in.

In the example of the network attribute, the network attribute may be one of two values, WiFi or Cellular. In this example, these event values are treated as the two states that the network attribute can be in at any given time. In heartbeats, network events include indications of when the player was using WiFi or Cellular, along with corresponding timestamps. In some embodiments, a network event occurs when the network attribute value changes. For example, suppose that at time t=1, the network value was WiFi. At time t=8, the network value changed to Cellular. This change in network value is an event that is included in the heartbeat. However, between time t=1 and t=8, no network values were sent (as the value was WiFi during that period). This is shown in the example of FIGS. 4A and 4B.

In some embodiments, the network field is tracked over time, where the extracted network values from heartbeats are encoded as spans. In some embodiments, a span includes a start time, an end time, and a value that the attribute had between the start time and the end time.

In some embodiments, the timeline representation is a data structure that includes a set of span data structures. For example, an event-to-state operator is executed to convert the raw events shown in FIG. 4A (which is based, for example, on the raw heartbeat data shown above) to the representation shown in FIG. 4B. In some embodiments, the timeline processor is configured to convert raw events recorded at discrete points in time into state functions over time (also referred to herein as a timeline state representation of an attribute, where the timeline representation is generated by performing a transformation on the raw event data).

For example, the timeline representation of FIG. 4B is encoded as a set of spans, where each span is determined when a change in the value of the network attribute was detected from the raw data. For example, the timeline representation of FIG. 4B is implemented with the following spans:

Span_1: {start_time: t=1, end_time: t=7, value: WiFi},
Span_2: {start_time: t=8, end_time t=14, value: Cellular}.

In some embodiments of the timeline data model representation, the start and end times are inclusive.

In some embodiments, the timeline representation of FIG. 4A is also encoded as a set of spans, where each span represents zero or more raw events. In some embodiments, one span contains a list of events (here in this example denoted as a comma-separated list of event values enclosed in square brackets) that happened at the end_time of the span. For example, the timeline representation of FIG. 4A is implemented with the following spans:

Span_1: {start_time: t=1, end_time: t=1, value: [WiFi]},
Span_2: {start_time: t=2, end_time t=8, value: [Cellular]}, Span_3: {start_time: t=9, end_time: t=14, value: [ ]}.

The above example is an example event-type timeline object in which events are encoded.

In some embodiments, timeline data structures include lists of spans, such as in the example shown above, storing the "span" s of interest where the timeline had a particular value. Various other semantically equivalent encodings of the timeline data structure may be used as appropriate, such as using discretized vector measurements in time, columnar representations akin to columnar analytics databases, and other compressed representations as well. The above example representations are usable directly as data structures (in addition to other semantically equivalent data structures).

In some embodiments, new spans are created, and current spans are closed when a raw event indicates a change in state of the attribute. For example, a new span is generated when an event indicating a change in the value of an attribute is encountered. The now-previous span is closed. For example, at time t=8, a change in the network state value is determined (as it has changed from WiFi to Cellular). Based on this change, the first span is closed, where its end time, which had previously been unspecified and open, is now set to t=7, or the time step just prior to the time of the newly observed value (as this indicates when the network state value stopped being WiFi), thereby closing the span. For example, if the new value was received at time T, then the previous span's end time is now T-1. As one example, the time is modeled discretely, at a granularity of nanoseconds, or any other granularity of units of time or time steps as appropriate.

A new span is created to track the span of time that the network attribute is in its new state of Cellular. The start time is set to be when the new network state was detected, which is t=8. The end time for this new span is not set until the next timestamp at which the state of the network changes yet again. In another embodiment, the end time of a current span is set to be the timestamp of the most recent heartbeat. If a heartbeat comes at the next timestamp, and the attribute value has not changed, then the span is extended by updating the end time of the span to be that next timestamp. This is to account for the fact that the timeline processing is occurring in real time, as raw or observed or reported data samples are being streamed (in real-time) and ingested. In this example, the new span is added to or otherwise included in the sequence of spans of the timeline representing the attribute, and the new span is temporally subsequent to the previous span in the sequence.

As shown in the example above, a timeline object representing the attribute over time includes a sequence of spans or span elements. Each span specifies an interval of time and an associated value of the attribute over that time interval. The spans are created and updated as observed values of the attribute (which are associated with corresponding timestamps of when the events occurred, were sampled, were reported, etc.) are streamed in.

In one embodiment, a span element includes a span start time, a span end time, and a span value. For example, the span start time and the span end time specify a time interval of the span. In some embodiments, the span value is an encoding of the value(s) of the attribute over that time interval specified by the start time and end time. For example, while raw data values for the network attribute may be received intermittently (e.g., when changes in the network attribute occur) as shown in the above example, such as at time t=1 and time t=8, spans are created that specify the value of the network attribute over all time. For example, the span value in the first span of the sequence encodes that the network attribute is the constant state value of "WiFi" during the entire interval of time specified from the start time to the end time of the span. In this way, the span representation may be queried for the value of the network attribute at any time, such as at time t=5, which would return the span value of "WiFi", even though a network sample corresponding to time t=5 did not exist in the stream of raw data.

Performing such a conversion of observed attribute samples into a compact timeline representation using the techniques described herein provides various benefits. For example, specifying an encoding of value(s) of an attribute that is valid over an interval of time that is determined by a start time and end time specified in a span element allows for a compact representation of the varying of the attribute over time, in contrast to explicit enumerating of the value at each possible timestamp. This provides an improvement in the amount of storage needed to maintain information pertaining to the evolution of values of the attribute over time. The encoding of time-varying attribute values in the compact span representation described herein reduces the amount of storage needed to maintain the information about the attribute over continuous time. Further, the compact representation provides for the benefit of indicating a value for the attribute at points in time where samples were not taken or observed (e.g., at intermediate points in time between times at which samples were taken).

The following are further embodiments of determining the parameters (start time, end time, and encoded value) of a span. In the above example, the end time of a most recent span, and a start time of a next span in the sequence of spans in a timeline representation were determined based on receiving of updated values of an attribute. For example, the end time of a current span is updated until an event timestamp corresponding to a change in state of the attribute is received, where the end time is no longer updated for the current span element, and a new span is created in the sequence to encode the new attribute state and the interval of time over which the new attribute state value is valid.

In some embodiments, the end times and/or start times of spans are determined using other types of time markers. One example of such a marker of time is based on watermarks that are determined when processing real-time streaming data. For example, while a data point or event may be received by the platform at a certain time, the actual event timestamp of a raw data point (timestamp of when the event occurred) would be some time prior. Due to delays, lateness in receipt of data may result in that data not being appropriately incorporated (e.g., where it should have been incorporated based on event time, but was received by the processing system too late to be included). Watermarking may be used to determine thresholds for accounting for late receipt or arrival of events.

In some embodiments, the start/end times of spans may be set to timestamps determined based on watermarks. For example, a span end time may be set to a timestamp that is determined according to a watermark threshold (which specifies, for example, an expected or allowed amount of lateness between event time and receipt time), such that for that interval of time specified for the span, no late arrivals of data points are expected (which could potentially indicate changes or updates to the attribute state value that would require, for example, the end time of the span to be retroactively changed based on the late-arriving event). A new, subsequent span element is also created in the sequence of spans, where the start time is based on the timestamp generated according to the watermark threshold, where the value for the new span is set to the value of the prior span (in the case where a new event data value was not received). Existing spans may be closed (e.g., end time is set and no longer changed), and new spans created based on new watermark-based timestamps being determined (which may occur as a batch process over time).

In some embodiments, the value of the attribute at a given timestamp or point in time is determined by querying the timeline with the given queried-for timestamp and determining which span (which has a corresponding time span) the queried for timestamp is included in. The value of the attribute at that span is returned.

As described above, it would be beneficial to determine when a timeline for an attribute has a certain value. In some embodiments, this is performed by using what is referred to as an "Equals" operator, which takes as input an attribute timeline, and generates a Boolean (e.g., true-false timeline such as that shown in the examples of FIGS. 4C and 5C). For example, each of the spans in the timeline representation is accessed, and the value for each span is compared against a value of interest. A new timeline is generated that has the same spans, but for each span, now has a true or false value based on the comparison between the attribute value for that span and the value of interest.

Time-State Metric Request Configuration

As shown in the above example of determining how much time did a video session spend in connection-induced buffering when using cellular, the computation of the time-state metric involved the execution of a chain of operators applied in a particular sequence to transform raw events to timeline representations, manipulate timeline representations (e.g., perform logical operations on timelines to combine them), as well as determine measures (e.g., cumulative duration) on timelines.

In some embodiments, the chain or sequence of operators used as primitives to construct or build the time-state metric is expressed as a directed acyclic graph (DAG) of operators. The processing logic represented by the DAG of operators is registered as a configuration for the time-state metric. Such processing logic is used to perform computations on the event stream in a streaming manner.

Figure 7:
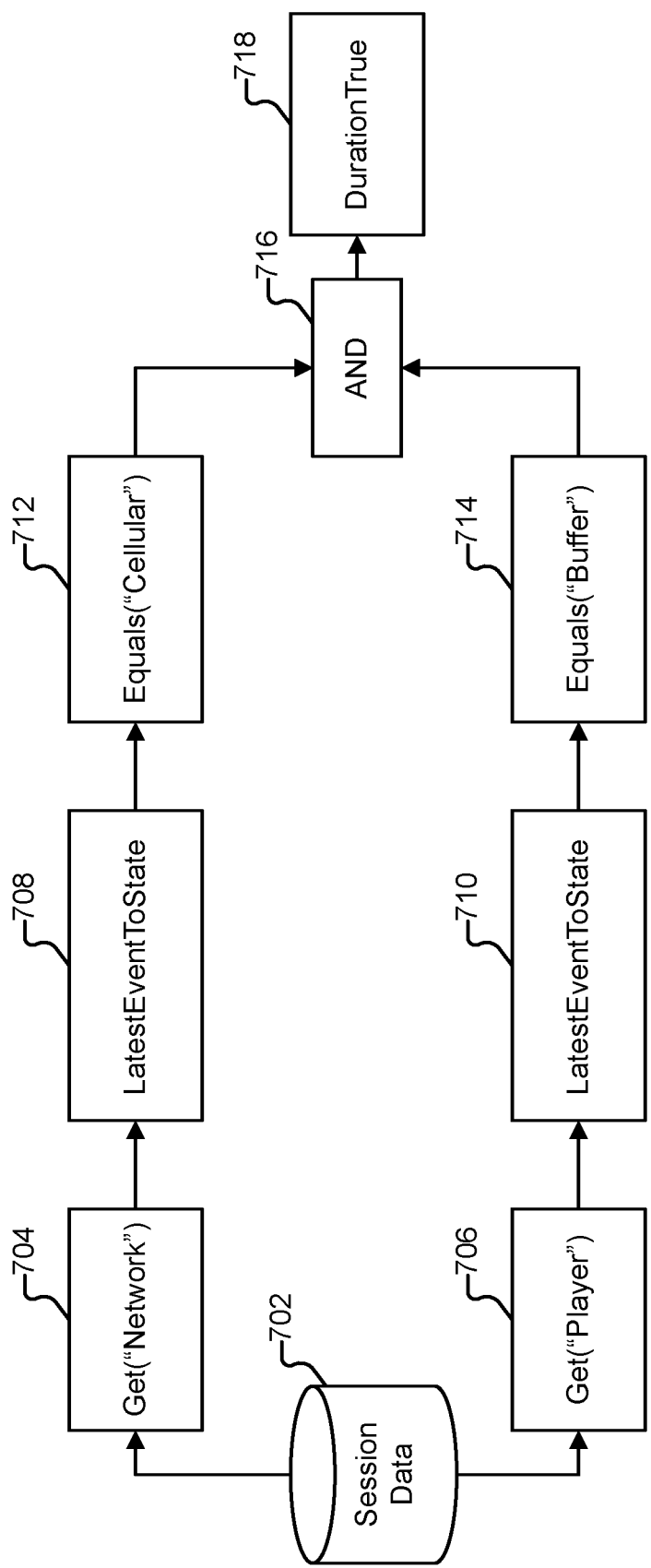
FIG. 7 illustrates an embodiment of a time-state metric directed acyclic graph.

FIG. 7 illustrates an embodiment of a time-state metric directed acyclic graph. FIG. 7 shows an example composition of operators to create a metric DAG for the time-state metric above (How much time did each video session spend in connection-induced buffering when using Cellular?). In this example, Get operators 704 and 706 are used to extract specified attributes (network and player attributes, respectively) from the session data 702 (that may be streaming in). Timeline representations are generated by using the "LatestEventToState" operators 708 and 710 to generate the timelines shown in the examples of FIGS. 4B and 5B, respectively. In this example, the "GET" operators are configured to extract specified information (e.g., specific fields, or according to a function) from raw data (e.g., JSON format heartbeats, or any other raw data format such as CSV). The "LatestEventToState" operator is configured to take the extracted values for the field and convert the raw events into a timeline representation with the encoding of spans as described above (and update the timeline representation as new events are received).

Equals operators 712 and 714 are used to generate the True/False timelines shown in the examples of FIGS. 4C and 5C, respectively. For example, the equals operator is configured to compare each update or state with a fixed value or parameter specified for the parameter (network=True and player=buffer), producing True or False.

The output timelines provided as outputs of operators 712 and 714 are logically ANDed together using timeline AND operator 716 to create the timeline shown in the example of FIG. 6B. The timeline of FIG. 6B is then passed as input to duration operator 718, which is configured to perform integration and create the timeline shown in the example of FIG. 6C.

The DAG representation of a time-state metric is used to capture the sequence of operations to be executed, as well as the combining of sub-operations, which models the combining of multiple contexts in multiple states.

As shown in this example, a node of a DAG representation of a time-state metric is an operator (selected form the operator library) with (optional) corresponding parameters. The directionality of the edges between nodes indicates the input to an operator node, and where the output of the operator node proceeds to (e.g., another node in the graph of operators). Further details regarding timeline operators are described below.

Operator Graph Optimizations

In some embodiments, new metrics are registered to the timeline analytics system. For example, an ensemble of metrics may be registered or configured, where each time-state metric is represented as a DAG.

In some embodiments, the DAGs of the metrics in an ensemble are evaluated, and DAG consolidation is performed. For example, graphs or subgraphs of operators that are common to multiple metrics are identified so that they are only determined once (rather than being computed multiple times and repeated for the entire ensemble). This is one example type of DAG optimization. The following are further details of performing such operator graph optimization.

As described above, a compiler is configured to read timeline metric configurations and execute the metric by implementing the operators in the DAG representation of the timeline metric configuration. In some embodiments, multiple time-state metrics are to be applied to the stream of raw data for a session (where the collection of time-state metrics is referred to herein also as an ensemble of time-state metrics). In some embodiments, the compiler is configured to perform optimizations such as consolidation, which includes determining whether there are any common or overlapping portions of the graph representations of the collection of time-state metrics being computed. When a portion of a graph that is common to two or more time-state metrics is identified, the sequence of operations (e.g., sub-graph of nodes) identified in the common portion of the graph is performed once, rather than being repeated for each graph metric computation. For example, one global sub-DAG of operators can be performed. For example, by representing time-state metrics as a directed graph of operators, graph optimizations are performed to prevent common nodes (where nodes are operators, and the common nodes are those operators that are being performed across multiple metrics) from being repeated. Rather, that portion of time-state processing is reused. In some embodiments, such graph optimizations are performed by the compiler. This improves computation efficiency and reduces computation cost.

For example, the compiler is configured to identify subgraphs that are common to graph representations of two or more time-state metrics in an ensemble of multiple time-state metrics to be applied to an incoming session's raw data. In some embodiments, the consolidation performed by the compiler includes performing merging of DAGs.

Figure 8:
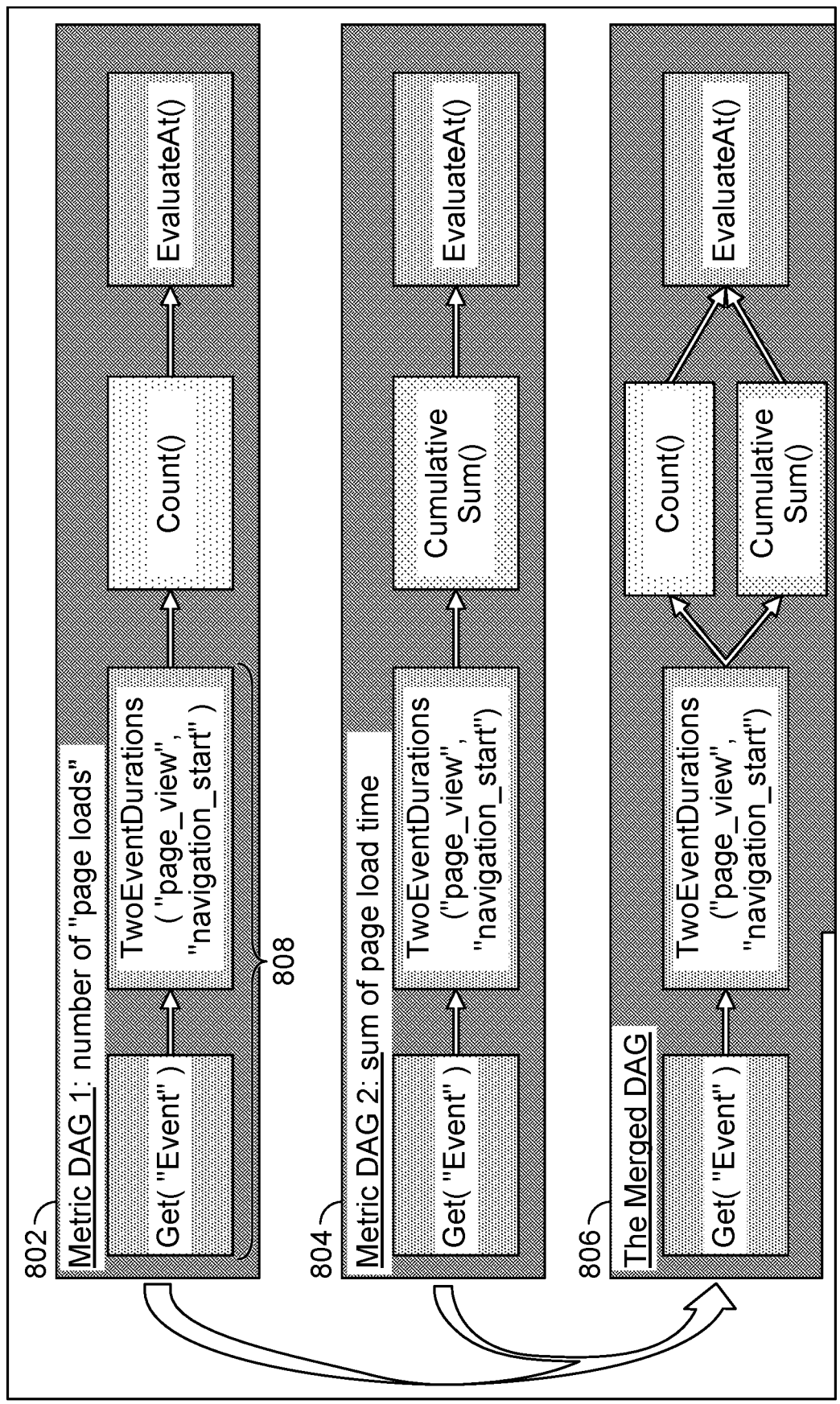
FIG. 8 illustrates an embodiment of merging time-state metric graph representations.

FIG. 8 illustrates an embodiment of merging time-state metric graph representations. In this example, suppose two time-state metric graph representations 802 and 804 are in an ensemble of metrics to be applied to a session's stream of raw data. As shown in the DAG representations of the metrics, the two metrics' graphs share common subgraph portions, such as the subgraph 808 with the node for the operator Get with the same parameter of "Event" to get, as well the next node being the TwoEventDurations operator, also with the same parameters "page_view" and "navigation_start." At the end of both metrics is also the EvaluateAt( ) operator.

As shown in this example, the compiler is configured to evaluate the DAGs of both Metric DAG 1 and Metric DAG 2 and identify overlapping portions of the timeline graph representations to be executed. As an optimization, the compiler merges the two DAGs to generate merged DAG 806. As shown in this example, by having graph representations of time-state metrics (which are composed of sequences of operators), various types of graph optimizations may be performed to reduce computation cost. For example, the subgraph with nodes Get ("Event") and TwoEventDurations ("page_view", "navigation_start") need not be performed (e.g., executed) twice.

Timeline Configuration File Example

FIG. 9 illustrates an embodiment of a timeline configuration file. In this example, the configuration file is in a JSON format from a particular host. The configuration file may be written in other formats, as appropriate. In this example, at 902, an identifier of the computation scope (session identifier path to events for the session) to which the time-state metric will be applied is shown. At 904, the data that will be used to designate timestamps is also indicated, as different data may be encoded differently.

The DAG portion 906 includes named nodes, such as "rawEvents" (908), "events" (910), "attemptTrue" (912), "timeToFirstAttempt" (914), "evaluatedInRealtime" (906), etc. For each node, the following node parameters are specified:

op: the timeline operator to be performed in: the input to the node that the timeline operator will operate on. The input may be the output of another node, the logical combination of multiple outputs, etc.

In some cases, multiple metrics may share portions of their respective DAGs.

In the example of the rawEvents node 908, the operator is "eventSourceTimeline" which is applied to the source raw data included in heartbeats.

Following the node specifications of the inputs, outputs, and operators forms a directed-acyclic graph of a processing chain of operations. Each operator refers to what the input node is. For example, the operation called "get" refers to the output "rawEvents."

In this example, the "rawEvents" node is configured to use the operator "eventSourceTimeline" to convert the source data from the heartbeat format to a timeline compatible format. The heartbeats for a session (identified by the session identifier path) specified in the source parameter are treated as an event source. The "events" node includes a "get" op(eration) that takes as input the raw event timeline from the "rawEvents" node (where the "$" symbol refers to the output of a node in the DAG).

In some embodiments, the node specifies a parameter to be used in conjunction with the operator, which includes, for example, a field name in a data set.

Some operators, such as the "attemptTrue," take as input two timelines. That is, an operator may be configured to take in multiple inputs. Operators may also provide multiple timelines as output.

In this example, the time-state metrics configuration also includes a taps section 918. In some embodiments, the taps portion is a specification of where (e.g., output of particular node) in the DAG that output data is to be obtained. For example, the output of any node may be tapped and provided as output. In this example, the output of node 916 ("evaluatedInRealtime") is to be obtained. A specification of where and how the tapped output is to be provided is shown at destination portion 920. For example, a protocol and server location for the output to be sent to is specified. The outputs of multiple nodes of the DAG may be specified and provided as output.

Operator Taxonomy

The following is an example taxonomy of time-state operators:

Extract: Take in as input raw data or a time-state object (object with timeline representation) and perform manipulations (e.g., get by field, filter by value) to produce time-state objects (e.g., timelines).

Transform: Take in as input one or more timelines and apply different types of arithmetic (e.g., add, subtract, multiply, divide), logic (e.g., AND, OR, Not, etc.), comparisons (e.g., =Equals, <Less than, >Greater than, >=Greater than or equal to, <=Less than or equal to, etc.), accumulations (e.g., count, duration), stateful operations (e.g., time between events) to produce new timeline objects. Example types of transform operators include logic, arithmetic, comparison, stateful model, accumulator, etc.

In some embodiments, applying a transformation to a timeline includes evaluating each span in a timeline, and applying the transformation to the span value in a given span. An output timeline is generated with a corresponding set of spans, but with the span values including transformed versions of the span values of the input timeline. In some embodiments timeline operations are configured to combine two or more timelines and generate a third timeline as output. In some embodiments, the value for the output timeline at a given point in time is determined by accessing the spans of the input timelines, determining which spans of the input timelines the given point in time belongs, and determining the values of the spans that the given point in time is included in. The transformation is then applied to the values obtained from the input timelines. The result of the transformation is then included in the output timeline. In this way, for the output timeline, the value of the output timeline at all points in time for the session is determined. For example, for every point in time, an input timeline is queried. The value of the attribute at the queried-for time is returned. For example, querying a timeline at a queried-for time includes identifying a span in which the queried-for time is included. The span value for the identified span in which the queried-for time is included is returned. If the span value is a function, then the value at the queried-for time is determined according to the function specified in the span value. A transformation is applied to the value returned based on the querying of the input timeline with the queried-for time. If there are multiple input timelines, then each of the input timelines is queried at a queried-for time, as described above, and the returned values are combined in accordance with an operator to be performed. An output timeline is then updated based on the combining of the values returned from the querying of the input timelines.

As shown in the example above, in some embodiments, the output of the timeline operator is also a timeline, which also includes a sequence of spans, where the parameters of each span (start time, end time, and encoded value for the interval of time specified by the start and end times) in the output sequence are determined based on the transformation applied to the span elements of the input timeline.

The number of spans in the output sequence need not match the number of spans in the input sequence, or have the same start/end times. For example, when a timeline operator evaluates a span in the input sequence of spans, this may result in splitting of the input span into multiple spans in the output sequence.

As one example, suppose an operator that checks whether a condition is True if a value is above a threshold, or False if the value is below the threshold. Suppose a span in the input sequence of spans with the following span parameters:

Input_span: {start_time: t1; end_time: t3; value: y=m*time+b)

Suppose that based on the encoded value of the input span, which is a linear function of time in this example, the operator determines that the condition is False (value is below the threshold) until t2, and True on/after t2, where time t2 is between t1 and t3.

This results in the operator splitting the input span into two output spans, such as the following:

Output_span_1: {start_time: t1, end_time: t2-1, value=False}, Output_span_2: {start_time: t2, end_time: t3, value=True)

Export: Take in as input one or more timeline objects and repackage them into a format/schema that is amenable or compatible for a downstream consumer (e.g., file, database, stream, etc.).

As described above, in some embodiments, metrics are implemented as a DAG of time-state operators. The operators are implemented to operate in the domain of timeline representations/data models, where the operators may then be composed in a variety of ways to create time-state metrics as desired. For example, the set of operators (except for "GET" and "LatestEventToState," which encode raw events measured at points in time into spans) takes timelines as input, and outputs timelines. This allows the output of one operator to become the input of the next or subsequent operator.

The following are further embodiments of timeline operator taxonomy.

In some embodiments, operators are classified along the following dimensions:
Stateful vs. Stateless Operation
Number of Inputs: Unary vs. Binary vs. K-ary
Type of Input/Output Timelines specified by the temporal type, value type, etc. for input and output timelines
Computation: Mathematical/Algebraic function to apply FIG. 10 illustrates an embodiment of time-state operators. One example of such an operator is referred to herein as "LatestEventToState." In some embodiments, the latest event to state operator is configured to perform stateful modeling, including treating event updates as state machine values. This includes interpreting raw event data as a state machine, where updates to events (changes in attribute values) are triggers that are interpreted as state or status changes.

In some embodiments, generating a timeline request configuration includes selecting a set of timeline operators and specifying an arrangement (e.g., chain or sequence) of the timeline operators to form a time-state metric. In some embodiments, a library of timeline operators is provided for selection by a designer, where the timeline operators provided form a set of primitives from which time-state metrics are composed.

In some embodiments, each timeline operator is associated with a set of code to implement the timeline operator. FIG. 11 illustrates an embodiment of a timeline operator. In this example, the code shown is configured to take a timeline of events as input and produce a timeline of states, which may be used, for example, to compute a cumulative count of events, or interpret events as state changes.

Handling of Attributes with Continuous Values and Discrete Events

The network attribute described above is an example of a step function or state function-type event data, where the value for the attribute is one of a finite set of discrete states. The events related to the network attribute are converted into states in a timeline representation.

Not every event is convertible into a state change (where, for example, the value of an attribute is constrained to being one of a finite set of values). For example, frame rate is a continuous measurement. When a change in frame rate value is received in a heartbeat, this does not necessarily mean that the frame rate was the same value between the current timestamp and the last time a frame rate measurement was received. For example, if at timestamp t=1, the frame rate was reported as 60 frames per second, and at timestamp t=10, it is reported that the frame rate was measured to be 30 frames per second, this does not necessarily mean that the frame rate had stayed at 60 frames per second between t=1 and t=10. That is, for attributes with continuous values, what is received in the raw data may include samples of measurements, which are not necessarily translatable into a finite set of states. That is, not every piece of raw data can necessarily be translated from an event to a state machine.

The following are embodiments of operators for transforming attributes with continuous measurement values (of which samples are received over time) into a timeline representation, including encoding continuous measurement values into spans.

As one example, suppose that a bandwidth sample measurement is received in heartbeat messages. The timestamp at which a bandwidth sample was taken is recorded. In some embodiments, for each measurement sample, a span is created and/or a previous span is closed. For example, the timestamp corresponding with a received measurement sample is used to mark the end of one span and the start of a next span. In some embodiments, for the period between two bandwidth samples, interpolation is performed. For example, the values of the attribute during the interval of time are encoded as a time-dependent function.

As one example, linear interpolation is performed between the bandwidth values. In this way, according to the linear function, the interpolated bandwidth at a time between the two timestamps is determined. This results in a timeline that has piecewise linear spans. For example, the bandwidth samples are treated as events at discrete points in time. The value for the attribute at intermediate points in time within the span between the times of two bandwidth samples is determined based on interpolation (e.g., linear interpolation, polynomial interpolation, or any other type of interpolation as appropriate). For example, in the data structure for a timeline representation of an attribute with continuous values, the value for a span (e.g., for timestamps in the span between two samples) is specified as a function of the sample values received at the beginning and end of the span. In some embodiments, the sample itself is recorded as a zero-width span, for example, with the start time set to be the same as the end time, and with the value of the zero-width span being the sample measurement that was received in the raw data. In some embodiments, the samples themselves are encoded in an event-type timeline.

Duration is another example of a continuously changing value, which may be a native value from raw data, or a derived measurement. Consider for example FIG. 6C. In some embodiments, such a continuous value that changes over time is represented or encoded in a numerical-type timeline object. As one example, the timeline representation for the timeline of FIG. 6C has the following data structure representation:

{start_time: 0, end_time: 9, value: 0} {start_time: 10, end_time: 14, value: duration=(time−10)}

In this example, the possible values of the attribute within the span or interval of time are encoded in a function that, as one example, is determined based on linear extrapolation/interpolation, where the value within a span (start time to end time) is determined according to a linear function of time. In the span from t=0 to t=90, there was no change in value, the slope was 0, and the value is 0. In the span from t=10 to t=14, the value is encoded as a linear function of the form y=m*time+b, where the slope m is 1 and the intercept b is −10.

In some embodiments, time is modeled in a discrete manner, such as in the examples described herein. For example, inclusive spans and discrete time are used in various embodiments of the timeline data model described herein. In other embodiments, time is modeled continuously. That is, the timeline implementation described herein may be variously adapted to accommodate discrete or continuous models for time.

Another type of timeline is an event-type timeline that is used to encode discrete events. Examples of discrete events include indications of an occurrence of an action. For example, a user clicking on a button is an example of an occurrence of a discrete event, where there is not an associated state. The button press is recorded as a discrete event and provided as raw data. The following is an example of generating a timeline representation of discrete events. For such discrete events, the start time and the end time of the span are the same. In this way, the event is recorded. If the timeline is queried for a time in between the times at which the event was recorded, a null set may be returned (as that event was not known to have occurred in those in-between times).

As described above, example types of timelines include event timeline objects for encoding discrete events, state-dynamic-type timelines for encoding step (state) function, and numerical-type timelines for representing continuously evolving values. Span representations are generated for each type of event timeline. In the example of attributes with continuous values, while samples are received at discrete points in time, the value for spans (in the numerical-type timeline representation used to encode such continuous values) is determined as a function of the received samples. For example, rather than treating continuous values such as temperature measurements or humidity measurements as discrete values, they are treated as continuously evolving values, where samples are received, and the continuous nature of the attribute over time is represented by interpolation (where the value over time in some span is computed as a function rather than a specific value).

As shown in the above, three example types of timelines supported by the platform described herein include:
- StateDynamics: embodiments of this type of timeline capture a state having a value at each point in continuous time but changing at discrete points: e.g., player state and CDN state in the above examples. In some embodiments, this type of timeline captures state/step functions. For example, a step function-based timeline is generated and updated based on the latest measurement.
- Numerical: embodiments of this type of timeline represent (continuous) values varying over time. Such types of timelines may also arise as intermediate representations—for example, the cumulative time spent in the connection-induced rebuffering state. Examples of span values for such a type of timeline representation include time-dependent functions.
- Event: embodiments of this type of timeline capture a sequence of discrete events. As one example, user seek events, player state updates, and CDN updates are encoded as Event-type timelines.

Event-type timeline objects may entail sparse encodings, where instead of tracking whether events occurred at each timestamp/window, an event-type timeline object stores when events occur.

For StateDynamics and Numerical objects, in some embodiments, spans are defined. In some embodiments, a span is an event time interval associated with either the value over that interval (for StateDynamics-type timelines) or an encoding of its evolving numerical values (for Numerical-type timelines, such as encoding via time-dependent functions). In some embodiments, StateDynamics and Numerical-type timeline objects are represented as a compact list of span elements (rather than, for example, enumerating each timestamp/window).

As shown in the above examples, different types of timeline objects are used for representing different types of attributes, or are used to determine different types of encodings of values that vary over time. Different types of timeline objects are also associated with different ways of determining span starts/ends and encoding values.

The use of such compact data structures facilitates the efficient implementation of semantic-aware operations over such encodings.

Multidimensional Analytics

The following are embodiments of performing multidimensional aggregations and analytics.

As described above, in some embodiments, time-state metrics are computed within a certain scope, such as on a session-level basis. After session-level metrics have been computed and stored, aggregations over metadata may then be performed. For example, aggregations of the time-state metric across sessions that share one or more characteristics (e.g., device type, operating system type, location, etc.) may be performed. Examples of such roll-ups or aggregations include averages, counts, etc.

For example, the system performs pre-computing the per-session metric (as a stream of raw event data is ingested) using the timeline representation described above. A user may then perform an aggregation to determine what that metric was in aggregate for all sessions that happened for Android in San Francisco, or for any other segment, as desired. That is, in a first stage, individual, per-session metrics are computed. A second stage of processing includes performing aggregation across a segment of sessions that share a set of characteristics.

Figure 12:
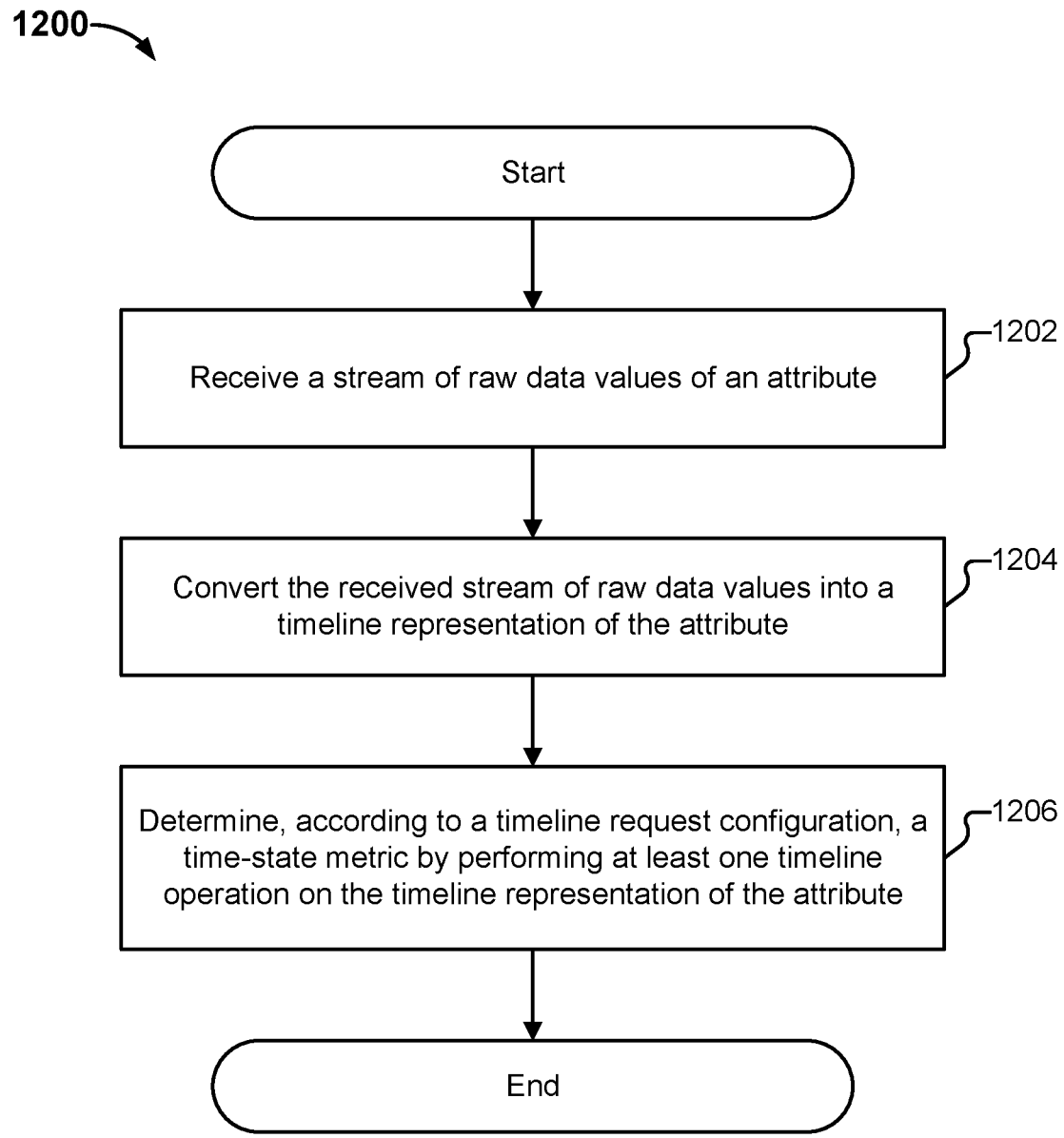
FIG. 12 illustrates an embodiment of determining a time-state metric.

FIG. 12 illustrates an embodiment of determining a time-state metric. In some embodiments, process 1200 is executed by time-state metrics system 300 of FIG. 3. The process begins at 1202 when a stream of raw or observed data values of an attribute is received. Each raw data value is associated with a timestamp (e.g., event timestamp of when an attribute value was measured, collected, reported, sampled, etc.).

At 1204, the received stream of raw data values is converted into a timeline representation of the attribute over time. In some embodiments, the converting includes encoding the received stream of raw data values into a sequence of one or more spans or span elements. In some embodiments, a span element includes a span start time, a span end time, and a span value. In some embodiments, the span value includes an encoding of the value (or values) of the attribute over a time interval determined by the start time and the end time of the span. For example, a span is an event time interval associated with either the value over that interval (e.g., for attributes with finite states), or an encoding of its evolving (over time) numerical values (e.g., for attributes with continuous values).

As one example, the value associated with a span is (semantically) encoded as a constant value (e.g., state) for the interval of time. For example, raw events with observed values at sparse, discrete points in time are converted or encoded into values specified over intervals of time, allowing for the value of the attribute to determined over all time (and not just at the timestamps corresponding to when events were observed or reported).

As another example, the value associated with a span is encoded as a time-dependent function that is valid over, or otherwise applicable to, the interval of time (e.g., function that determines, as a function of time, the value of the attribute at points in time within the span's specified time interval).

In some embodiments, the timeline objects representing attributes over time are represented as a sequence of spans. As one example, a timeline object is represented as a compact list of span elements. As another example, a timeline object is represented as a table, where each row represents a span, and the table includes columns for span parameters, such as span start time, span end time, and span value. Further details regarding encoding of raw or observed data values into spans of a timeline representation are described above.

At 1206, a time-state metric is computed according to a timeline request configuration. The timeline request configuration includes one or more timeline operations. The time-state metric is computed at least in part by performing a timeline operation on the timeline representation of the attribute. Further details regarding timeline request configurations, composing of time-state metrics using a set of timeline operators, graph representations of time-state metrics, etc. are described above. In some embodiments, determining the time-state metric includes performing computations on, or otherwise combining, timeline representations of multiple different attributes whose values may vary over time (and where the attributes may be of different data types).

Figure 13:
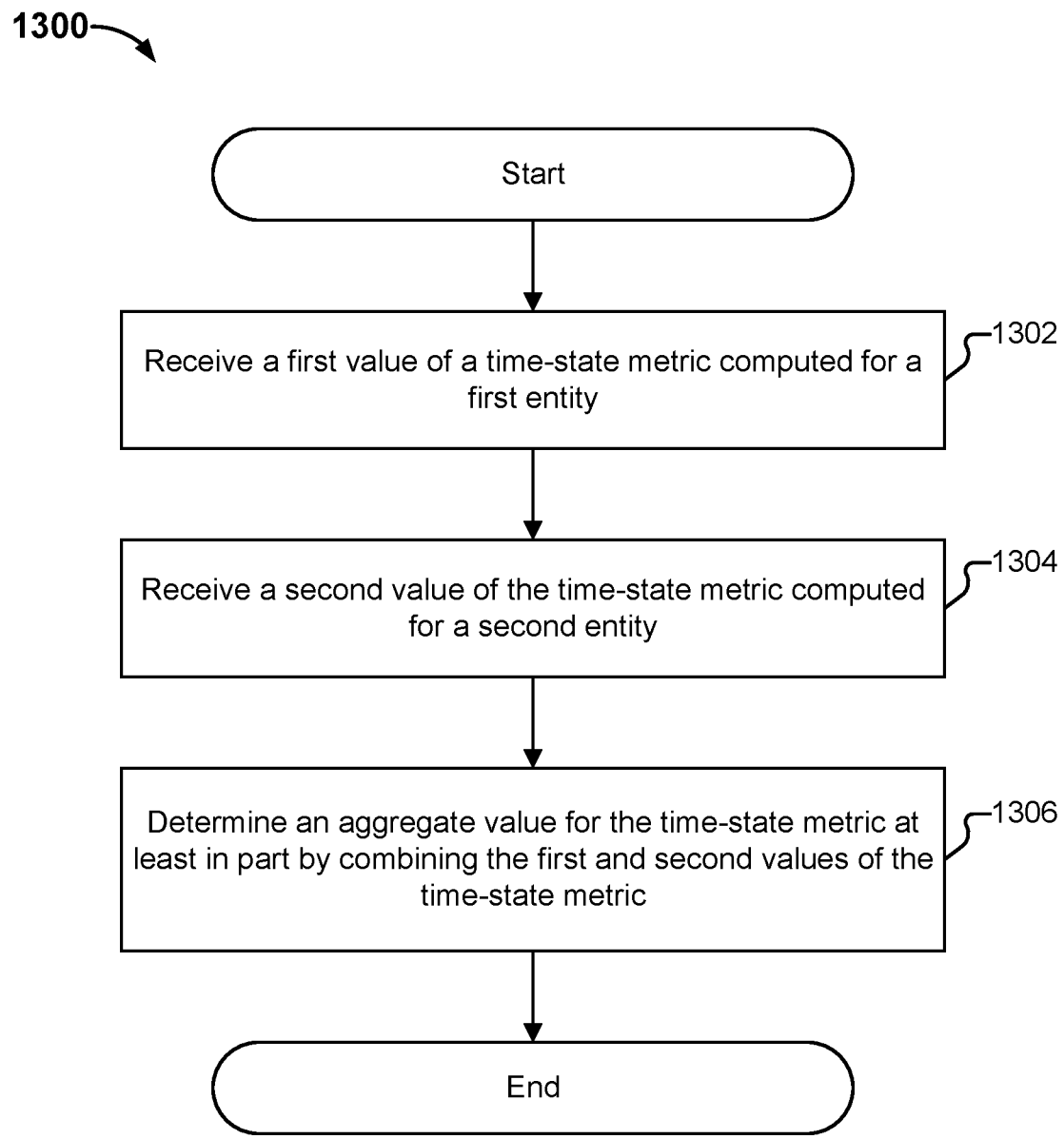
FIG. 13 illustrates an embodiment of performing multi-dimensional aggregation of time-state metrics.

FIG. 13 illustrates an embodiment of performing multi-dimensional aggregation of time-state metrics. In some embodiments, process 1300 is executed by multidimensional analytics engine 208 of FIG. 2. The process begins at 1302 when a first value of a time-state metric computed for a first entity is received. In some embodiments, the first value of the time-state metric is computed using process 1200 of FIG. 12. For example, the first value of the time-state metric is computed at least in part by performing, according to a timeline request configuration, one or more timeline operations on a first timeline representation of an attribute for the first entity, where the first timeline representation is generated at least in part by converting a first stream of raw data values of the attribute associated with the first entity into a first set of span data structures comprised in the first timeline representation of the attribute for the first entity.

At 1304, a second value of the time-state metric computed for a second entity is received. In some embodiments, the second value of the time-state metric is computed using process 1200 of FIG. 12. For example, the second value of the time-state metric is computed at least in part by performing, according to the timeline request configuration, the one or more timeline operations on a second timeline representation of the attribute associated with the second entity generated at least in part by converting a second stream of raw data values of the attribute associated with the second entity into a second set of span data structures comprised in the second timeline representation of the attribute for the second entity At 1306, an aggregate value for the time-state metric is determined at least in part by combining the first value of the time-state metric and the second value of the time-state metric computed, respectively, for the first entity and the second entity. For example, the first entity and the second entity are grouped together into a segment based at least in part on one or more shared dimensional attributes. For example, the first entity and the second entity are two video streaming sessions that are grouped together based on the first and second sessions sharing dimensional attributes in common (e.g., common CDN, ISP, device type, etc.). Based on the grouping of the first entity and the second entity into the segment, an aggregate value for the time-state metric is determined by performing an aggregation on the first and second values of the time-state metric.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more processors configured to:
receive a stream of raw data values of an attribute recorded at discrete points in time, wherein each received raw data value of the attribute is associated with a timestamp;
convert the received stream of raw data values into a timeline representation of the attribute over time, wherein the timeline representation comprises a sequence of spans, wherein a span comprises a span start time, a span end time, and a span value, and wherein the span value comprises an encoding of one or more values of the attribute over a time interval determined by the span start time and the span end time, and wherein when a change in value of the attribute is detected from the stream of raw data values, a current span is closed and a new span is generated; and
determine a time-state metric according to a timeline request configuration, wherein the timeline request configuration comprises one or more timeline operations, and wherein the time-state metric is computed at least in part by performing a timeline operation on the timeline representation of the attribute; and
a memory coupled to the one or more processors and configured to provide the one or more processors with instructions.

2. The system recited in claim 1, wherein the stream of raw data values comprises a first value of the attribute associated with a first time and a second value of the attribute associated with a second time.

3. The system recited in claim 2, wherein based at least in part on a determination that the second value of the attribute is different from the first value, the one or more processors are configured to update the current span, wherein the span start time comprises the first time, the span end time comprises a time value prior to the second time, and the span value comprises the first value.

4. The system recited in claim 2, wherein based at least in part on a determination that the second value of the attribute is different from the first value, the one or more processors are configured to generate the new span, wherein a span start time of the new span comprises the second time.

5. The system recited in claim 1, wherein the one or more processors are further configured to encode and export a metric value of the time-state metric.

6. The system recited in claim 1, wherein the one or more timeline operations comprised in the timeline request configuration are represented using a graph representation.

7. The system recited in claim 6, wherein the graph representation comprises a plurality of nodes, and wherein a node comprises the timeline operation.

8. The system recited in claim 6, wherein the graph representation comprises a directed acyclic graph.

9. The system recited in claim 1, wherein the timeline operation is configured to take as input one or more input timeline representations and provide as output one or more output timeline representations.

10. The system recited in claim 1, wherein determining the time-state metric comprises combining timeline representations of two or more different attributes.

11. A method, comprising:
receiving a stream of raw data values of an attribute recorded at discrete points in time, wherein each received raw data value of the attribute is associated with a timestamp;
converting the received stream of raw data values into a timeline representation of the attribute over time, wherein the timeline representation comprises a sequence of spans, wherein a span comprises a span start time, a span end time, and a span value, and wherein the span value comprises an encoding of one or more values of the attribute over a time interval determined by the span start time and the span end time, and wherein when a change in value of the attribute is detected from the stream of raw data values, a current span is closed and a new span is generated; and determining a time-state metric according to a timeline request configuration, wherein the timeline request configuration comprises one or more timeline operations, and wherein the time-state metric is computed at least in part by performing a timeline operation on the timeline representation of the attribute.

12. The method of claim 11, wherein the stream of raw data values comprises a first value of the attribute associated with a first time and a second value of the attribute associated with a second time.

13. The method of claim 12, wherein based at least in part on a determination that the second value of the attribute is different from the first value, updating the current span, wherein the span start time comprises the first time, the span end time comprises a time value prior to the second time, and the span value comprises the first value.

14. The method of claim 12, wherein based at least in part on a determination that the second value of the attribute is different from the first value, generating the new span, wherein a span start time of the new span comprises the second time.

15. The method of claim 11, further comprising encoding and exporting a metric value of the time-state metric.

16. The method of claim 11, wherein the one or more timeline operations comprised in the timeline request configuration are represented using a graph representation.

17. The method of claim 16, wherein the graph representation comprises a plurality of nodes, and wherein a node comprises the timeline operation.

18. The method of claim 16, wherein the graph representation comprises a directed acyclic graph.

19. The method of claim 11, wherein the timeline operation is configured to take as input one or more input timeline representations and provide as output one or more output timeline representations.

20. The method of claim 11, wherein determining the time-state metric comprises combining timeline representations of two or more different attributes.

21. A computer program product embodied in a non-transitory computer readable medium and comprising computer instructions for:

receiving a stream of raw data values of an attribute recorded at discrete points in time, wherein each received raw data value of the attribute is associated with a timestamp;

converting the received stream of raw data values into a timeline representation of the attribute over time, wherein the timeline representation comprises a sequence of spans, wherein a span comprises a span start time, a span end time, and a span value, and wherein the span value comprises an encoding of one or more values of the attribute over a time interval determined by the span start time and the span end time, and wherein when a change in value of the attribute is detected from the stream of raw data values, a current span is closed and a new span is generated; and determining a time-state metric according to a timeline request configuration, wherein the timeline request configuration comprises one or more timeline operations, and wherein the time-state metric is computed at least in part by performing a timeline operation on the timeline representation of the attribute.

* * * * *